(12) United States Patent
Cai et al.

(10) Patent No.: US 11,979,855 B2
(45) Date of Patent: May 7, 2024

(54) RESOURCE SELECTION METHOD AND TERMINAL DEVICE

(71) Applicant: HUAWEI TECHNOLOGIES CO., LTD., Guangdong (CN)

(72) Inventors: Yu Cai, Beijing (CN); Yongbo Zeng, Beijing (CN); Da Wang, Shenzhen (CN); Jian Wang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 421 days.

(21) Appl. No.: 16/969,130

(22) PCT Filed: Feb. 1, 2019

(86) PCT No.: PCT/CN2019/074480
§ 371 (c)(1),
(2) Date: Aug. 11, 2020

(87) PCT Pub. No.: WO2019/154333
PCT Pub. Date: Aug. 15, 2019

(65) Prior Publication Data
US 2021/0045088 A1 Feb. 11, 2021

(30) Foreign Application Priority Data
Feb. 12, 2018 (CN) .......................... 201810144182.8

(51) Int. Cl.
*H04W 72/56* (2023.01)
*H04W 28/26* (2009.01)
(Continued)

(52) U.S. Cl.
CPC ........... *H04W 72/02* (2013.01); *H04W 28/26* (2013.01); *H04W 72/0446* (2013.01);
(Continued)

(58) Field of Classification Search
CPC . H04W 72/02; H04W 28/26; H04W 72/0406; H04W 72/0446; H04W 72/0473;
(Continued)

(56) References Cited

U.S. PATENT DOCUMENTS

2006/0109864 A1* 5/2006 Oksman .................. H04L 7/041
370/465
2006/0193260 A1* 8/2006 George ................. H04L 49/901
370/235

(Continued)

FOREIGN PATENT DOCUMENTS

CN 103702359 A 4/2014
CN 105472738 A 4/2016
(Continued)

OTHER PUBLICATIONS

Ericsson,"Resource Reselection", 3GPP TSG RAN WG1 Meeting #85, R1-165263, Nanjing, People's Republic of China, May 23-27, 2016, total 6 pages. (Year: 2016).*

(Continued)

*Primary Examiner* — Thinh D Tran
(74) *Attorney, Agent, or Firm* — WOMBLE BOND DICKINSON (US) LLP

(57) ABSTRACT

A method includes: determining, by a first terminal device, a first resource, where the first resource includes one or more of a resource used by a second terminal device to transmit data, a resource reserved by the second terminal device to transmit data, a resource determined based on the resource used by the second terminal device to transmit data, and a resource determined based on the resource reserved by the second terminal device to transmit data; and skipping, by the first terminal device, using a second resource, or reselecting, by the first terminal device, a resource, if the first resource and the second resource overlap.

20 Claims, 5 Drawing Sheets

A first terminal device determines a first resource — S201

If the first resource and a second resource overlap, the first terminal device does not use the second resource, or the first terminal device reselects a resource — S202

(51) Int. Cl.
*H04W 72/02* (2009.01)
*H04W 72/044* (2023.01)
*H04W 72/0446* (2023.01)
*H04W 72/20* (2023.01)
*H04W 72/53* (2023.01)
*H04W 92/18* (2009.01)

(52) U.S. Cl.
CPC ....... *H04W 72/0473* (2013.01); *H04W 72/20* (2023.01); *H04W 72/53* (2023.01); *H04W 72/56* (2023.01); *H04W 92/18* (2013.01)

(58) Field of Classification Search
CPC . H04W 72/0493; H04W 72/10; H04W 92/18; H04W 4/40; H04W 72/04; H04W 28/04; H04W 72/044; H04W 72/20; H04W 72/53; H04W 72/56; H04L 5/00; H04L 5/0082; Y02D 30/70
See application file for complete search history.

(56) References Cited

U.S. PATENT DOCUMENTS

| | | | |
|---|---|---|---|
| 2016/0278128 A1* | 9/2016 | Krishnamurthy ... | H04W 74/085 |
| 2016/0381630 A1 | 12/2016 | Krishnamoorthy et al. | |
| 2019/0075547 A1* | 3/2019 | Chae .................... | H04W 28/04 |
| 2021/0329657 A1* | 10/2021 | Tang ................. | H04W 72/0453 |

FOREIGN PATENT DOCUMENTS

| | | | |
|---|---|---|---|
| CN | 106550318 A | | 3/2017 |
| CN | 106792885 A | | 5/2017 |
| CN | 107484254 A | | 12/2017 |
| EP | 3163916 A4 | | 7/2017 |
| WO | 2017116108 A1 | | 7/2017 |
| WO | 2017156973 A1 | | 9/2017 |
| WO | 2017176088 A1 | | 10/2017 |

OTHER PUBLICATIONS

Huawei et al, "Details of sensing based collision avoidance", 3GPP TSG RAN WG1 Meeting #84, R1-162641, Busan, Korea, Apr. 11-15, 2016, total 8 pages. (Year: 2016).*
Intel Corporation, Design Options to Support Priority for V2V Communication, 3GPP TSG RAN WG1 Meeting #85, R1-164139, Nanjing, China, May 23-27, 2016, 6 pages.
LG Electronics, Status Report to TSG, Support for V2V services based on LTE sidelink , 3GPP TSG RAN meeting #72, RP-160792, Busan, Korea, Jun. 13-16, 2016, 23 pages.
R1-1720163, CATT, Discussion on resource pool sharing between mode 3 and mode 4, 3GPP TSG RAN WG1 Meeting #91, Reno, USA, Nov. 27-Dec. 1, 2017, total 4 pages.
R1-1720258, Samsung, Discussion on support of latency smaller than 20, 3GPP TSG RAN WG1 Meeting #91, Reno, USA, Nov. 27-Dec. 1, 2017, total 3 pages.
Samsung,"Triggering conditions for resource reselection", 3GPP TSG RAN WG1 Meeting #85, R1-164760, Nanjing, May 23-27, 2016, total 4 pages.
Huawei et al,"Details of sensing procedure and resource (re)selection triggering mechanisms", 3GPP TSG RAN WG1 Meeting #86, R1-166169, Gothenburg, Sweden, Aug. 22-26, 2016, total 6 pages.
Huawei et al,"Details of sensing based collision avoidance", 3GPP TSG RAN WG1 Meeting #84, R1-162641, Busan, Korea, Apr. 11-15, 2016, total 8 pages.
Ericsson, "Resource Reselection", 3GPP TSG RAN WG1 Meeting #85, R1-165263, Nanjing, People's Republic of China, May 23-27, 2016, total 6 pages.

* cited by examiner

RESOURCE SELECTION METHOD AND TERMINAL DEVICE

CROSS-REFERENCE TO RELATED APPLICATIONS

This application is a National Stage of International Application No. PCT/CN2019/074480, filed on Feb. 1, 2019, which claims priority to Chinese Patent Application No. 201810144182.8, filed on Feb. 12, 2018. Both of the aforementioned applications are herein incorporated by reference in their entireties.

TECHNICAL FIELD

This application relates to the field of communications technologies, and in particular, to a resource selection method and a terminal device.

BACKGROUND

Cellular network-based device-to-device (D2D) communication, also referred to as a proximity service (ProSe) in a 3rd generation partnership project (3GPP), is a new technology in which under control of a system, terminal devices are allowed to directly communicate with each other by multiplexing cell resources. This can improve spectral efficiency of a cellular communications system, reduce transmit power of a terminal device, and resolve, to some extent, a problem of a lack of spectrum resources in a wireless communications system.

In D2D internet of vehicles (V2X) communication, there are two resource allocation modes of a terminal device, and the two allocation modes are respectively a mode 3 and a mode 4. The mode 3 is a resource allocation mode in which a base station performs scheduling. To be specific, the base station may schedule a resource or a parameter used by the terminal device for communication performed on a sidelink. The mode 4 is a resource allocation mode in which the terminal device performs autonomously selection. To be specific, the terminal device may autonomously select a resource or a parameter used for communication performed on a sidelink. In the prior art, in the mode 4, the terminal device may select or reselect a resource through sensing (sensing, which may also be understood as monitoring or listening), or the terminal device selects or reselects a resource in an autonomous selection mode based on random selection. After the resource is selected, the resource may be used for a plurality of times of data transmission. When the terminal device performs, for a specific quantity of times, transmission by using the resource, the terminal device may reselect a resource. The terminal device in the mode 4 may select a resource from a resource pool to transmit data. The resource pool is a set of resources, and a resource scheduled for the terminal device in the mode 3 does not overlap, in time domain, the resource in the resource pool used by the resource in the mode 4.

If (some or all) resources in a resource pool are shared by the terminal device in the mode 3 and the terminal device in the mode 4, because the base station cannot learn of a resource autonomously selected by the terminal device in the mode 4, a resource scheduled by the base station for the terminal device in the mode 3 may conflict with the resource autonomously selected by the terminal device in the mode 4; or because the terminal device that randomly selects a resource does not perform sensing, a resource selected by the terminal device may conflict with a resource selected by a terminal device that performs sensing, causing a resource conflict between the terminal devices. Therefore, the resource conflict between the terminal devices is an urgent problem to be resolved by a person skilled in the art.

SUMMARY

This application provides a resource selection method and a terminal device, to resolve a problem that there is a resource conflict between terminal devices when a resource in a resource pool is a shared resource.

According to a first aspect, an embodiment of this application provides a resource selection method. The resource selection method may include:

determining, by a first terminal device, a first resource, where the first resource includes one or more of a resource used by a second terminal device to transmit data, a resource reserved by the second terminal device to transmit data, a resource determined based on the resource used by the second terminal device to transmit data, and a resource determined based on the resource reserved by the second terminal device to transmit data; and skipping, by the first terminal device, using a second resource, or reselecting, by the first terminal device, a resource, if the first resource and the second resource overlap, where the second resource includes one or more of a resource selected by the first terminal device to transmit data, a candidate resource to be used by the first terminal device to transmit data, a resource determined based on the resource selected by the first terminal device to transmit data, and a resource determined based on the candidate resource to be used by the first terminal device to transmit data.

In one embodiment, the resource reserved to transmit data is determined based on a resource reservation interval and a resource used by a second terminal device to transmit data. The resource reserved to transmit data and the resource used by the second device to transmit data are separated by the resource reservation interval in time domain; and the resource reserved to transmit data and the resource used by the second device to transmit data are the same in frequency domain, or in frequency domain, the resource reserved to transmit data is determined based on a frequency hopping pattern and the resource used by the second device to transmit data.

It can be learned that before selecting the resource, the first terminal device first determines a first resource corresponding to the second terminal device, to determine whether the first resource overlaps the resource selected by the first terminal device. If the first resource overlaps the resource selected by the first terminal device, the first terminal device does not use the second resource, or the first terminal device reselects a resource. In this way, a problem that there is a resource conflict between terminal devices when a resource in a resource pool is a shared resource is resolved.

In one embodiment, the determining, by a first terminal device, a first resource may include:

receiving, by the first terminal device, first information sent by the second terminal device, where the first information is used to indicate the resource used by the second terminal device to transmit data; and determining, by the first terminal device, the first resource based on the resource used by the second terminal device to transmit data.

In one embodiment, the determining, by a first terminal device, a first resource may include: determining, by the first terminal device, the first resource based on second information and the resource used by the second terminal device to transmit data, where the second information is used to indicate a reservation interval; or the second information is used to indicate a set of resource reservation periods that are available to the first terminal device or the second terminal device; or the second information is used to indicate a value range of a first parameter, where the first parameter is used to indicate a set of resource reservation periods that are available to the first terminal device or the second terminal device.

In one embodiment, the skipping, by the first terminal device, using a second resource, or reselecting, by the first terminal device, a resource, if the first resource and the second resource overlap may include: skipping, by the first terminal device, using the second resource, or reselecting, by the first terminal device, a resource, if the first resource and the second resource overlap, and a preset condition is met, where the preset condition includes one or more of the following: a receive power at which the first terminal device receives a signal sent by the second terminal device, a priority of transmission data of the first terminal device and/or a priority of transmission data of the second terminal device, a type of transmission data of the first terminal device and/or a type of transmission data of the second terminal device, a quantity of times that the first terminal device transmits data and/or a quantity of times that the second terminal device transmits data, and a quantity of second resources.

In one embodiment, the preset condition includes the receive power at which the first terminal device receives the signal sent by the second terminal device, and the skipping, by the first terminal device, using the second resource, or reselecting, by the first terminal device, a resource, if the first resource and the second resource overlap, and a preset condition is met may include: skipping, by the first terminal device, using the second resource, or reselecting, by the first terminal device, a resource, if the first resource and the second resource overlap, and the receive power at which the first terminal device receives the signal sent by the second terminal device is greater than a first threshold.

In one embodiment, the preset condition includes the priority of the transmission data of the first terminal device and/or the priority of the transmission data of the second terminal device, and the skipping, by the first terminal device, using the second resource, or reselecting, by the first terminal device, a resource, if the first resource and the second resource overlap, and a preset condition is met may include: skipping, by the first terminal device, using the second resource, if the first resource and the second resource overlap, and the priority of the transmission data of the first terminal device is less than or equal to a second threshold; or skipping, by the first terminal device, using the second resource, if the first resource and the second resource overlap, and the priority of the transmission data of the second terminal device is greater than or equal to a third threshold; or skipping, by the first terminal device, using the second resource, if the first resource and the second resource overlap, the priority of the transmission data of the first terminal device is less than or equal to a second threshold, and the priority of the transmission data of the second terminal device is greater than or equal to a third threshold; or reselecting, by the first terminal device, a resource if the first resource and the second resource overlap, and the priority of the transmission data of the first terminal device is greater than a fourth threshold; or reselecting, by the first terminal device, a resource if the first resource and the second resource overlap, and the priority of the transmission data of the second terminal device is greater than or equal to a fifth threshold; or reselecting, by the first terminal device, a resource if the first resource and the second resource overlap, the priority of the transmission data of the first terminal device is greater than a fourth threshold, and the priority of the transmission data of the second terminal device is greater than or equal to a fifth threshold.

In one embodiment, the preset condition includes the priority of the transmission data of the first terminal device and the priority of the transmission data of the second terminal device, and the skipping, by the first terminal device, using the second resource, or reselecting, by the first terminal device, a resource, if the first resource and the second resource overlap, and a preset condition is met may include: skipping, by the first terminal device, using the second resource, or reselecting, by the first terminal device, a resource, if the first resource and the second resource overlap, and a difference between the priority of the transmission data of the first terminal device and the priority of the transmission data of the second terminal device is less than or equal to a sixth threshold.

In one embodiment, the preset condition includes the type of the transmission data of the first terminal device and/or the type of the transmission data of the second terminal device, and the skipping, by the first terminal device, using the second resource, or reselecting, by the first terminal device, a resource, if the first resource and the second resource overlap, and a preset condition is met may include: skipping, by the first terminal device, using the second resource, if the first resource and the second resource overlap, and the transmission data of the first terminal device is non-security-related data; or skipping, by the first terminal device, using the second resource, if the first resource and the second resource overlap, and the transmission data of the second terminal device is security-related data; or skipping, by the first terminal device, using the second resource, if the first resource and the second resource overlap, the transmission data of the first terminal device is non-security-related data, and the transmission data of the second terminal device is security-related data; or reselecting, by the first terminal device, a resource if the first resource and the second resource overlap, and the transmission data of the first terminal device is security-related data; or reselecting, by the first terminal device, a resource if the first resource and the second resource overlap, and the transmission data of the second terminal device is security-related data; or reselecting, by the first terminal device, a resource if the first resource and the second resource overlap, the transmission data of the first terminal device is security-related data, and the transmission data of the second terminal device is security-related data.

In one embodiment, the preset condition includes the quantity of times that the first terminal device transmits the data and/or the quantity of times that the second terminal device transmits the data, and the skipping, by the first terminal device, using the second resource, or reselecting, by the first terminal device, a resource, if the first resource and the second resource overlap, and a preset condition is met may include: skipping, by the first terminal device, using the second resource, if the first resource and the second resource overlap, and the transmission data of the first terminal device is retransmission data; or skipping, by the first terminal device, using the second resource, if the first resource and the second resource overlap, and the transmission data of the second terminal device is initial transmission data; or skipping, by the first terminal device, using the second resource, if the first resource and the second resource overlap, the transmission data of the first terminal device is retransmission data, and the transmission data of the second terminal device is initial transmission data; or reselecting, by the first terminal device, a resource if the first resource and the second resource overlap, and the transmission data of the first terminal device is initial transmission data; or reselecting, by the first terminal device, a resource if the first resource and the second resource overlap, and the transmission data of the second terminal device is initial transmission data; or reselecting, by the first terminal device, a resource if the first resource and the second resource overlap, the transmission data of the first terminal device is initial transmission data, and the transmission data of the second terminal device is initial transmission data.

In one embodiment, the preset condition includes the quantity of second resources, and the skipping, by the first terminal device, using the second resource, or reselecting, by the first terminal device, a resource, if the first resource and the second resource overlap, and a preset condition is met may include:
  skipping, by the first terminal device, using the second resource, if the first resource and the second resource overlap, and the quantity of second resources is less than or equal to a seventh threshold; or skipping, by the first terminal device, using the second resource, if the first resource and the second resource overlap, and a quantity of subframes in which the second resource is located is less than or equal to an eighth threshold; or reselecting, by the first terminal device, a resource if the first resource and the second resource overlap, and the quantity of second resources is greater than a ninth threshold; or reselecting, by the first terminal device, a resource if the first resource and the second resource overlap, and a quantity of subframes in which the second resource is located is greater than a tenth threshold.

In one embodiment, before the skipping, by the first terminal device, using a second resource, or reselecting, by the first terminal device, a resource, if the first resource and the second resource overlap, the method may further include: determining, by the first terminal device, that a resource allocation mode of the second terminal device is any one of the following modes: a mode in which a base station schedules a resource; a mode of selecting a resource based on partial sensing; a mode of selecting a resource based on sensing; and a mode of selecting a resource based on random selection.

In one embodiment, a resource allocation mode of the first terminal device is any one of the following modes: a mode of autonomously selecting a resource; a mode of selecting a resource based on non-partial sensing; and a mode of selecting or reselecting a resource based on sensing.

According to a second aspect, an embodiment of this application further provides a terminal device. The terminal device may include:
  a determining unit, configured to determine a first resource, where the first resource includes one or more of a resource used by a second terminal device to transmit data, a resource reserved by the second terminal device to transmit data, a resource determined based on the resource used by the second terminal device to transmit data, and a resource determined based on the resource reserved by the second terminal device to transmit data; and a processing unit, configured to: skip using a second resource, or reselect a resource, if the first resource and the second resource overlap, where the second resource includes one or more of a resource selected by the terminal device to transmit data, a candidate resource to be used by the terminal device to transmit data, a resource determined based on the resource selected by the terminal device to transmit data, and a resource determined based on the candidate resource to be used by the terminal device to transmit data.

In one embodiment, the determining unit may include a receiving subunit and a determining subunit. The receiving subunit is configured to receive first information sent by the second terminal device, where the first information is used to indicate the resource used by the second terminal device to transmit data; and
  the determining subunit is configured to determine the first resource based on the resource used by the second terminal device to transmit data.

In one embodiment, the determining unit is specifically configured to determine the first resource based on second information and the resource used by the second terminal device to transmit data, where
  the second information is used to indicate a reservation interval; or the second information is used to indicate a set of resource reservation periods that are available to the terminal device or the second terminal device; or the second information is used to indicate a value range of a first parameter, where the first parameter is used to indicate a set of resource reservation periods that are available to the terminal device or the second terminal device.

In one embodiment, the processing unit is specifically configured to: skip using the second resource, or reselect a resource, if the first resource and the second resource overlap, and a preset condition is met, where the preset condition includes one or more of the following:
  a receive power at which the terminal device receives a signal sent by the second terminal device, a priority of transmission data of the terminal device and/or a priority of transmission data of the second terminal device, a type of transmission data of the terminal device and/or a type of transmission data of the second terminal device, a quantity of times that the terminal device transmits data and/or a quantity of times that the second terminal device transmits data, and a quantity of second resources.

In one embodiment, the preset condition includes the receive power at which the terminal device receives the signal sent by the second terminal device; and
  the processing unit is specifically configured to skip using the second resource, or reselect a resource, if the first resource and the second resource overlap, and the receive power at which the terminal device receives the signal sent by the second terminal device is greater than a first threshold.

In one embodiment, the preset condition includes the priority of the transmission data of the terminal device and/or the priority of the transmission data of the second terminal device; and
  the processing unit is specifically configured to: skip using the second resource, if the first resource and the second resource overlap, and the priority of the transmission data of the terminal device is less than or equal to a second threshold; or
  skip using the second resource, if the first resource and the second resource overlap, and the priority of the transmission data of the second terminal device is greater than or equal to a third threshold; or skip using the second resource, if the first resource and the second resource overlap, the priority of the transmission data of the terminal device is less than or equal to a second threshold, and the priority of the transmission data of the second terminal device is greater than or equal to a third threshold; or reselect a resource if the first resource and the second resource overlap, and the priority of the transmission data of the terminal device is greater than a fourth threshold; or reselect a resource if the first resource and the second resource overlap, and the priority of the transmission data of the second terminal device is greater than or equal to a fifth threshold; or reselect a resource if the first resource and the second resource overlap, the priority of the transmission data of the terminal device is greater than a fourth threshold, and the priority of the transmission data of the second terminal device is greater than or equal to a fifth threshold.

In one embodiment, the preset condition includes the priority of the transmission data of the terminal device and the priority of the transmission data of the second terminal device; and the processing unit is specifically configured to: skip using the second resource, or reselect a resource, if the first resource and the second resource overlap, and a difference between the priority of the transmission data of the terminal device and the priority of the transmission data of the second terminal device is less than or equal to a sixth threshold.

In one embodiment, the preset condition includes the type of the transmission data of the terminal device and/or the type of the transmission data of the second terminal device; and the processing unit is specifically configured to: skip using the second resource, if the first resource and the second resource overlap, and the transmission data of the terminal device is non-security-related data; or skip using the second resource, if the first resource and the second resource overlap, and the transmission data of the second terminal device is security-related data; or skip using the second resource, if the first resource and the second resource overlap, the transmission data of the terminal device is non-security-related data, and the transmission data of the second terminal device is security-related data; or reselect a resource if the first resource and the second resource overlap, and the transmission data of the terminal device is security-related data; or reselect a resource if the first resource and the second resource overlap, and the transmission data of the second terminal device is security-related data; or reselect a resource if the first resource and the second resource overlap, the transmission data of the terminal device is security-related data, and the transmission data of the second terminal device is security-related data.

In one embodiment, the preset condition includes the quantity of times that the terminal device transmits the data and/or the quantity of times that the second terminal device transmits the data; and the processing unit is specifically configured to: skip using the second resource, if the first resource and the second resource overlap, and the transmission data of the terminal device is retransmission data; or skip using the second resource, if the first resource and the second resource overlap, and the transmission data of the second terminal device is initial transmission data; or skip using the second resource, if the first resource and the second resource overlap, the transmission data of the terminal device is retransmission data, and the transmission data of the second terminal device is initial transmission data; or reselect a resource if the first resource and the second resource overlap, and the transmission data of the terminal device is initial transmission data; or reselect a resource if the first resource and the second resource overlap, and the transmission data of the second terminal device is initial transmission data; or reselect a resource if the first resource and the second resource overlap, the transmission data of the terminal device is initial transmission data, and the transmission data of the second terminal device is initial transmission data.

In one embodiment, the preset condition includes the quantity of second resources; and the processing unit is specifically configured to: skip using the second resource, if the first resource and the second resource overlap, and the quantity of second resources is less than or equal to a seventh threshold; or skip using the second resource, if the first resource and the second resource overlap, and a quantity of subframes in which the second resource is located is less than or equal to an eighth threshold; or reselect a resource if the first resource and the second resource overlap, and the quantity of second resources is greater than a ninth threshold; or reselect a resource if the first resource and the second resource overlap, and a quantity of subframes in which the second resource is located is greater than a tenth threshold.

In one embodiment, the determining unit is further configured to determine that a resource allocation mode of the second terminal device is any one of the following modes:
   a mode in which a base station schedules a resource;
   a mode of selecting a resource based on partial sensing;
   a mode of selecting a resource based on sensing; and
   a mode of selecting a resource based on random selection.

In one embodiment, a resource allocation mode of the terminal device is any one of the following modes:
   a mode of autonomously selecting a resource;
   a mode of selecting a resource based on non-partial sensing; and
   a mode of selecting or reselecting a resource based on sensing.

According to a third aspect, an embodiment of this application further provides a terminal device. The terminal device may include a processor and a memory, and the processor and the memory are connected through a communications bus.

The memory is configured to store a program instruction.

The processor is configured to invoke and execute the program instruction stored in the memory, to perform the following operations:
   determining a first resource, where the first resource includes one or more of a resource used by a second terminal device to transmit data, a resource reserved by the second terminal device to transmit data, a resource determined based on the resource used by the second terminal device to transmit data, and a resource determined based on the resource reserved by the second terminal device to transmit data; and skipping using a second resource, or reselecting a resource, if the first resource and the second resource overlap, where the second resource includes one or more of a resource selected by the terminal device to transmit data, a candidate resource to be used by the terminal device to transmit data, a resource determined based on the resource selected by the terminal device to transmit data, and a resource determined based on the candidate resource to be used by the terminal device to transmit data.

In one embodiment, the terminal device may further include a transceiver, where the transceiver is configured to receive first information sent by the second terminal device, where the first information is used to indicate the resource used by the second terminal device to transmit data; and in the operation of determining a first resource, the processor is specifically configured to invoke and execute the program instruction stored in the memory, to determine the first resource based on the resource used by the second terminal device to transmit data.

In one embodiment, in the operation of determining a first resource, the processor is specifically configured to invoke and execute the program instruction stored in the memory, to determine the first resource based on second information and the resource used by the second terminal device to transmit data; and the second information is used to indicate a reservation interval; or the second information is used to indicate a set of resource reservation periods that are available to the terminal device or the second terminal device; or the second information is used to indicate a value range of a first parameter, where the first parameter is used to indicate a set of resource reservation periods that are available to the terminal device or the second terminal device.

In one embodiment, in the operation of skipping using a second resource, or reselecting a resource, if the first resource and the second resource overlap, the processor is specifically configured to invoke and execute the program instruction stored in the memory, to skip using the second resource, or reselect a resource, if the first resource and the second resource overlap, and a preset condition is met, where the preset condition includes one or more of the following:

a receive power at which the terminal device receives a signal sent by the second terminal device, a priority of transmission data of the terminal device and/or a priority of transmission data of the second terminal device, a type of transmission data of the terminal device and/or a type of transmission data of the second terminal device, a quantity of times that the terminal device transmits data and/or a quantity of times that the second terminal device transmits data, and a quantity of second resources.

In one embodiment, the preset condition may include the receive power at which the terminal device receives the signal sent by the second terminal device; and in the operation of skipping using a second resource, or reselecting a resource, if the first resource and the second resource overlap, the processor is specifically configured to invoke and execute the program instruction stored in the memory, to skip using the second resource, or reselect a resource, if the first resource and the second resource overlap, and the receive power at which the terminal device receives the signal sent by the second terminal device is greater than a first threshold.

In one embodiment, the preset condition may include the priority of the transmission data of the terminal device and/or the priority of the transmission data of the second terminal device; and in the operation of skipping using a second resource, or reselecting a resource, if the first resource and the second resource overlap, the processor is specifically configured to invoke and execute the program instruction stored in the memory, to perform the following operations:

skipping using the second resource, if the first resource and the second resource overlap, and the priority of the transmission data of the terminal device is less than or equal to a second threshold; or skipping using the second resource, if the first resource and the second resource overlap, and the priority of the transmission data of the second terminal device is greater than or equal to a third threshold; or skipping using the second resource, if the first resource and the second resource overlap, the priority of the transmission data of the terminal device is less than or equal to a second threshold, and the priority of the transmission data of the second terminal device is greater than or equal to a third threshold; or reselecting a resource if the first resource and the second resource overlap, and the priority of the transmission data of the terminal device is greater than a fourth threshold; or reselecting a resource if the first resource and the second resource overlap, and the priority of the transmission data of the second terminal device is greater than or equal to a fifth threshold; or reselecting a resource if the first resource and the second resource overlap, the priority of the transmission data of the terminal device is greater than a fourth threshold, and the priority of the transmission data of the second terminal device is greater than or equal to a fifth threshold.

In one embodiment, the preset condition may include the priority of the transmission data of the terminal device and the priority of the transmission data of the second terminal device; and in the operation of skipping using a second resource, or reselecting a resource, if the first resource and the second resource overlap, the processor is specifically configured to invoke and execute the program instruction stored in the memory, to skip using the second resource, or reselect a resource, if the first resource and the second resource overlap, and a difference between the priority of the transmission data of the terminal device and the priority of the transmission data of the second terminal device is less than or equal to a sixth threshold.

In one embodiment, the preset condition may include the type of the transmission data of the terminal device and/or the type of the transmission data of the second terminal device; and in the operation of skipping using a second resource, or reselecting a resource, if the first resource and the second resource overlap, the processor is specifically configured to invoke and execute the program instruction stored in the memory, to perform the following operations:

skipping using the second resource, if the first resource and the second resource overlap, and the transmission data of the terminal device is non-security-related data; or skipping using the second resource, if the first resource and the second resource overlap, and the transmission data of the second terminal device is security-related data; or skipping using the second resource, if the first resource and the second resource overlap, the transmission data of the terminal device is non-security-related data, and the transmission data of the second terminal device is security-related data; or reselecting a resource if the first resource and the second resource overlap, and the transmission data of the terminal device is security-related data; or reselecting a resource if the first resource and the second resource overlap, and the transmission data of the second terminal device is security-related data; or reselecting a resource if the first resource and the second resource overlap, the transmission data of the terminal device is security-related data, and the transmission data of the second terminal device is security-related data.

In one embodiment, the preset condition may include the quantity of times that the terminal device transmits the data and/or the quantity of times that the second terminal device transmits the data; and in the operation of skipping using a second resource, or reselecting a resource, if the first resource and the second resource overlap, the processor is specifically configured to invoke and execute the program instruction stored in the memory, to perform the following operations:

skipping using the second resource, if the first resource and the second resource overlap, and the transmission data of the terminal device is retransmission data; or skipping using the second resource, if the first resource and the second resource overlap, and the transmission data of the second terminal device is initial transmission data; or skipping using the second resource, if the first resource and the second resource overlap, the transmission data of the terminal device is retransmission data, and the transmission data of the second terminal device is initial transmission data; or reselecting a resource if the first resource and the second resource overlap, and the transmission data of the terminal device is initial transmission data; or reselecting a resource if the first resource and the second resource overlap, and the transmission data of the second terminal device is initial transmission data; or reselecting a resource if the first resource and the second resource overlap, the transmission data of the terminal device is initial transmission data, and the transmission data of the second terminal device is initial transmission data.

In one embodiment, the preset condition may include the quantity of second resources; and in the operation of skipping using a second resource, or reselecting a resource, if the first resource and the second resource overlap, the processor is specifically configured to invoke and execute the program instruction stored in the memory, to perform the following operations:

skipping using the second resource, if the first resource and the second resource overlap, and the quantity of second resources is less than or equal to a seventh threshold; or skipping using the second resource, if the first resource and the second resource overlap, and a quantity of subframes in which the second resource is located is less than or equal to an eighth threshold; or reselecting a resource if the first resource and the second resource overlap, and the quantity of second resources is greater than a ninth threshold; or reselecting a resource if the first resource and the second resource overlap, and a quantity of subframes in which the second resource is located is greater than a tenth threshold.

In one embodiment, the processor is configured to invoke and execute the program instruction stored in the memory, to determine that a resource allocation mode of the second terminal device is any one of the following modes:
a mode in which a base station schedules a resource;
a mode of selecting a resource based on partial sensing;
a mode of selecting a resource based on sensing; and
a mode of selecting a resource based on random selection.

In one embodiment, a resource allocation mode of the terminal device is any one of the following modes:
a mode of autonomously selecting a resource;
a mode of selecting a resource based on non-partial sensing; and
a mode of selecting or reselecting a resource based on sensing.

According to a fourth aspect, an embodiment of this application further provides a terminal device. The terminal device may include a processor and a memory, and the processor and the memory are connected through a communications bus.

The memory is configured to store a program instruction.

The processor is configured to invoke and execute the program instruction stored in the memory, to perform the resource selection method according to any one of the possible implementations of the first aspect.

According to a fifth aspect, an embodiment of this application further provides a computer readable storage medium. The computer readable storage medium stores a computer program, and when the computer program is executed by a processor, the resource selection method according to any one of the possible implementations of the first aspect is performed.

According to a sixth aspect, an embodiment of this application further provides a chip. The chip stores a computer program, and when the computer program is executed by a processor, the resource selection method according to any one of the possible implementations of the first aspect is performed.

According to a seventh aspect, an embodiment of this application further provides a computer program product including an instruction. When the computer program product is run on a terminal device, the terminal device is enabled to perform the resource selection method according to any one of the possible implementations of the first aspect.

Embodiments of this application provide a resource selection method and a terminal device. The method includes: determining, by a first terminal device, a first resource, where the first resource includes one or more of a resource used by a second terminal device to transmit data, a resource reserved by the second terminal device to transmit data, a resource determined based on the resource used by the second terminal device to transmit data, and a resource determined based on the resource reserved by the second terminal device to transmit data; and skipping, by the first terminal device, using a second resource, or reselecting, by the first terminal device, a resource, if the first resource and the second resource overlap, where the second resource includes one or more of a resource selected by the first terminal device to transmit data, a candidate resource to be used by the first terminal device to transmit data, a resource determined based on the resource selected by the first terminal device to transmit data, and a resource determined based on the candidate resource to be used by the first terminal device to transmit data. It can be learned that when the first terminal device has selected the resource or is selecting the resource, the first terminal device first determines a first resource corresponding to the second terminal device, to determine whether the first resource overlaps the resource selected by the first terminal device or the candidate resource of the first terminal device. If the first resource overlaps the resource selected by the first terminal device or the candidate resource of the first terminal device, the first terminal device does not use the second resource, or the first terminal device reselects a resource. In this way, a problem that there is a resource conflict between terminal devices when a resource in a resource pool is a shared resource is resolved.

DESCRIPTION OF EMBODIMENTS

The embodiments of this application may be applied to various communications systems, for example, a global system for mobile communications (GSM) system, a code division multiple access (CDMA) system, a wideband code division multiple access (WCDMA) system, a general packet radio service (GPRS), long term evolution (LTE), a 5G communications system, or another system that may emerge in the future. The following explains some terms in this application, to help a person skilled in the art have a better understanding. It should be noted that when solutions in the embodiments of this application are applied to the 5G system or the another system that may emerge in the future, names of a network device and a terminal device may change, but this does not affect implementation of the solutions in the embodiments of this application.

Figure 1:
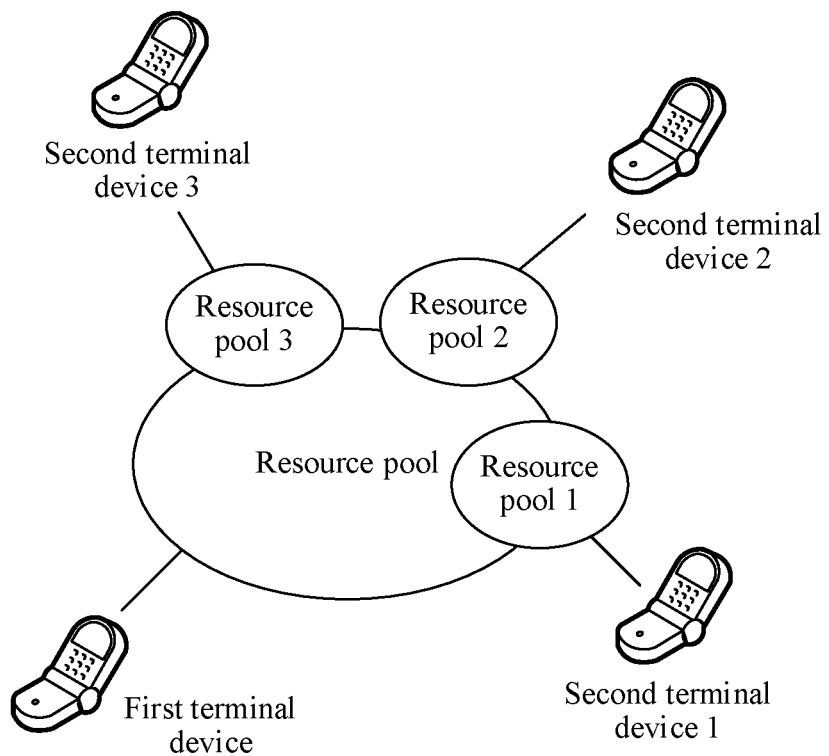
FIG. 1 is a schematic diagram of an application scenario according to an embodiment of this application.

FIG. 1 is a schematic diagram of an application scenario according to an embodiment of this application. The communications system may include at least one first terminal device and at least one second terminal device. Referring to FIG. 1, for example, the communications system includes one first terminal device and three second terminal devices. The three second terminal devices are respectively a second terminal device 1, a second terminal device 2, and a second terminal device 3. The first terminal device corresponds to a resource pool, and the first terminal device may select a resource in the resource pool to transmit data. A resource pool corresponding to the second terminal device 1 is a resource pool 1, a resource pool corresponding to the second terminal device 2 is a resource pool 2, and a resource pool corresponding to the second terminal device 3 is a resource pool 3. When a resource in the resource pool used by the first terminal device and a resource used by a second terminal device overlap (a resource is shared), the resource selected by the first terminal device and the resource used by the second terminal device may conflict. Certainly, the three second terminal devices may not have respective corresponding resource pools, and resources used by the three second terminal devices may be resources scheduled by a network device. The application scenario shown in FIG. 1 may be specifically an internet of vehicles V2X communications system.

(1) A terminal device, also referred to as a terminal or user equipment, is a device that provides a user with voice and/or data connectivity, for example, a handheld device or a vehicle-mounted device having a wireless connection function. Common terminal devices include, for example, a mobile phone, a tablet, a notebook computer, a palmtop computer, a mobile internet device (mobile internet device, MID), and a wearable device. The wearable device includes, for example, a smartwatch, a smart band, or a pedometer.

(2) A network device, also referred to as a radio access network (RAN) device, is a device that enables a terminal device to access a wireless network, and includes network devices in various communications standards, for example, includes but is not limited to a base station, an evolved NodeB (eNB), a radio network controller (radio network controller, RNC), a NodeB (NB), a network device controller (Base Station Controller, BSC), a network device transceiver station (BTS), a home network device (for example, Home evolved NodeB, or Home NodeB, HNB), and a baseband unit (BBU). The network device includes network devices of various frequency standards, for example, includes but is not limited to a low-frequency network device and a high-frequency network device.

(3) The term "plurality of" indicates two or more, and another quantifier is similar to the term "plurality of". The term "and/or" describes an association relationship between associated objects and represents that three relationships may exist. For example, A and/or B may represent the following three cases: Only A exists, both A and B exist, and only B exists. A character "/" usually indicates an "or" relationship between associated objects.

When a resource in a resource pool is a shared resource, there is a resource conflict between terminal devices. For example, a resource used by a terminal device for which a base station schedules a resource overlaps a resource in a resource pool used by a terminal device that autonomously selects a resource, a resource pool used by a terminal device based on non-partial sensing overlaps a resource pool used by a terminal device based on partial sensing; a resource pool used by a terminal device based on sensing overlaps a resource pool used by a terminal device that randomly selects a resource; if candidate resources of two terminal devices overlap in time domain when the two terminal devices select or reselect resources, the two terminal devices cannot sense information about a resource selected by each other and/or information about a resource reserved by each other, and consequently, resources selected by the two terminal devices may conflict; and when resource reservation intervals used by the two terminal devices are a specific combination, in an existing resource selection mechanism, a resource selected by a terminal device may also conflict with a resource selected by another terminal device. To resolve the foregoing problem, an embodiment of this application provides a resource selection method. Before selecting a resource, a first terminal device first determines a resource used by a second terminal device to transmit data and/or a resource reserved to transmit data, to determine whether the resource used by the second terminal device to transmit data and/or the resource reserved to transmit data overlap/overlaps a resource selected by the first terminal device. If the resource used by the second terminal device to transmit data and/or the resource reserved to transmit data overlap/overlaps the resource selected by the first terminal device, the first terminal device does not use the second resource, or the first terminal device reselects a resource.

The following uses specific embodiments to describe in detail the technical solutions of this application and how to resolve the foregoing technical problem in the technical solutions of this application. The following specific embodiments may be mutually combined, and same or similar concepts or processes may not be repeatedly described in some embodiments.

Figure 2:
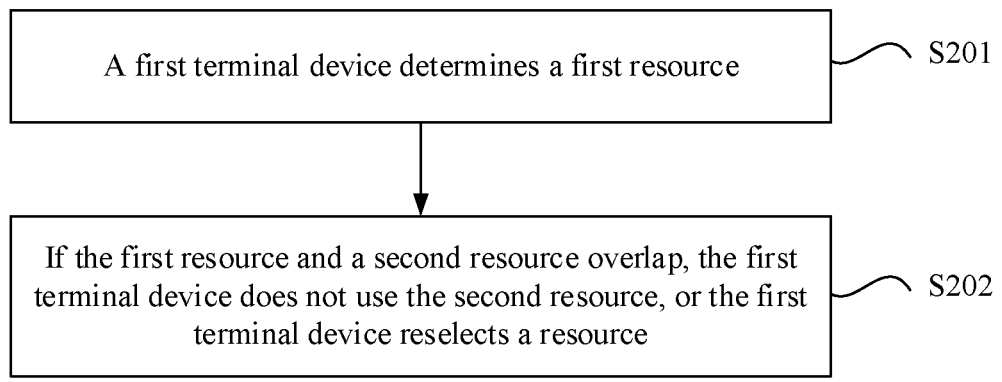
FIG. 2 is a schematic diagram of a resource selection method according to an embodiment of this application.

FIG. 2 is a schematic diagram of a resource selection method according to an embodiment of this application. The resource selection method may be performed by a first terminal device. Referring to FIG. 2, the resource selection method may include the following operations.

S201: The first terminal device determines that a resource selection mode of a second terminal device is a preset mode.

The preset mode may be any one of a mode in which a base station schedules a resource, a mode of selecting a resource based on partial sensing, a mode of selecting or reselecting a resource based on sensing, and a mode of selecting or reselecting a resource based on random selection.

For example, there may be one or more second terminal devices. Herein, a quantity of second terminal devices is not specifically limited in this embodiment of this application.

Likewise, a resource selection mode of the first terminal device may also be any one of the following modes:
the mode in which a base station schedules a resource, the mode of selecting a resource based on partial sensing, the mode of selecting a resource based on sensing, and the mode of selecting a resource based on random selection.

For example, when the first terminal device is a Release-15 terminal device, the second terminal device may be a Release-14 terminal device or a Release-15 terminal device; when the first terminal device is a terminal device that selects a resource based on non-partial sensing, the second terminal device may be a terminal device that selects a resource based on partial sensing; when the first terminal device is a terminal device that selects a resource based on sensing, the second terminal device may be a terminal device that selects a resource based on random selection; when the first terminal device is a terminal device that performs non-P2X-related V2X communication, the second terminal device may be a terminal device that performs P2X-related V2X communication; or certainly, the first terminal device and the second terminal device each may be a terminal device that selects a resource based on sensing.

For example, in this embodiment of this application, the first terminal device may determine the resource selection mode of the second terminal device based on first indication information, and the first indication information is used to indicate the resource allocation mode of the second terminal device. Optionally, the first indication information may be included in control information. In D2D communication or V2X communication defined in 3GPP, the control information may be SCI. Specifically, when the first terminal device determines the resource selection mode of the second terminal device, in one manner, the first indication information may indicate that the resource allocation mode of the second terminal device is the mode in which a base station schedules a resource, or that the resource allocation mode of the second terminal device is the mode of selecting a resource based on sensing. For example, the first indication information is 1 bit. When the first indication information is '0', it indicates that the resource allocation mode of the second terminal device is the mode in which a base station schedules a resource. When the first indication information is '1', it indicates that the resource allocation mode of the second terminal device is the mode of selecting a resource based on sensing. The first indication information may be included in control information sent by the second terminal device. In another manner, the first indication information may indicate that a resource pool in which a resource used by the first terminal device is located is a resource pool that is available to a terminal device in the mode in which the base station schedules a resource, or that a resource pool in which a resource used by the first terminal device is located is a resource pool that is available to a terminal device in the mode of selecting a resource based on sensing.

S202: The first terminal device determines a first resource.

The first resource includes one or more of a resource used by the second terminal device to transmit data, a resource reserved by the second terminal device to transmit data, a resource determined based on the resource used by the second terminal device to transmit data, and a resource determined based on the resource reserved by the second terminal device to transmit data.

Optionally, in this embodiment of this application, the resource reserved to transmit data is determined based on a resource reservation interval and a resource used by a second device to transmit data. The resource reserved to transmit data and the resource used by the second device to transmit data are separated by the resource reservation interval in time domain; and the resource reserved to transmit data and the resource used by the second device to transmit data are the same in frequency domain, or in frequency domain, the resource reserved to transmit data is determined based on a frequency hopping pattern and the resource used by the second device to transmit data.

It should be noted that the first terminal device may receive first information sent by the second terminal device, and the first information is used to indicate the resource used by the second terminal device to transmit data, so that the first terminal device can determine the first resource based on the resource used by the second terminal device to transmit data.

For example, the first information may be control information. In D2D communication or V2X communication defined in 3GPP, the first information may be sidelink control information (SCI).

In this embodiment of this application, after receiving SCI sent by the second terminal device, the first terminal device may determine the first resource based on the resource that is used by the second terminal device to transmit data and that is indicated by the SCI.

When the first resource includes any one or more of the resource reserved by the second terminal device to transmit data, the resource determined based on the resource used by the second terminal device to transmit data, and the resource determined based on the resource reserved by the second terminal device to transmit data, the first terminal device may determine the first resource based on second information and the resource used by the second terminal device to transmit data. The second information is used to indicate the resource reservation interval, and the resource reservation interval may also be referred to as a resource reservation period; or the second information is used to indicate a set of resource reservation periods that are available to the first terminal device or the second terminal device; or the second information is used to indicate a value range of a first parameter, where the first parameter is used to indicate a set of resource reservation periods that are available to the first terminal device or the second terminal device. In other words, when the first terminal device determines the first resource based on the second information and the resource used by the second terminal device to transmit data, there may be at least the following three possible implementations.

In one embodiment, the second information is used to indicate the resource reservation interval, and the first terminal device may determine the first resource based on the resource reservation interval and the resource used by the second terminal device to transmit data. Optionally, the first information may include the second information. For example, there may be the following three manners.

Manner 1: The first resource may include a resource 2 and the resource (represented by a resource 1) used by the second terminal device to transmit data. The resource 2 and the resource 1 are separated by M in time domain, where M is a value determined based on the second information. For example, M may be obtained by multiplying a value indicated by the second information by a coefficient P, where P is not 0. The resource 2 may be the same as the resource 1 in frequency, or the resource 2 and the resource 1 have a specific frequency hopping pattern in frequency. The resource 2 is the resource reserved by the second terminal device to transmit data.

Figure 3:
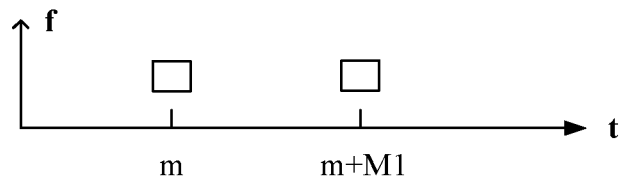
FIG. 3 is a schematic diagram of a first resource according to an embodiment of this application.

For example, the value indicated by the second information may be I1. In this case, M is equal to I1×P. FIG. 3 is a schematic diagram of a first resource according to an embodiment of this application. A resource in a subframe m is the resource (the resource 1) used by the second terminal device to transmit data, and the resource 2 is a resource that is in a subframe m+M1 and that has the same frequency as the resource 1. In this case, the resource 1 and the resource 2 are first resources.

It should be noted that in this embodiment of this application, that a subframe is used as a unit of resource in time domain is merely used as an example. There may be another unit, for example, may be any one of a slot, a mini-slot, and an orthogonal frequency division multiplexing (OFDM) symbol, or may be another time unit. This is not limited in this embodiment of the present invention.

Manner 2: The first resource may include a resource 2 and the resource (represented by a resource 1) used by the second terminal device to transmit data. The resource 2 and the resource 1 are separated by M×j in time domain, where j=1, 2, 3, . . . . Herein, M is a value determined based on the second information. For example, M may be obtained by multiplying a value indicated by the second information by a coefficient P, where P is not 0. The resource 2 may be the same as the resource 1 in frequency, or the resource 2 and the resource 1 have a specific frequency hopping pattern in frequency. The resource 2 includes the resource reserved by the second terminal device to transmit data and the resource determined based on the resource reserved by the second terminal device to transmit data.

Manner 3: A network device may configure a maximum quantity of times that a terminal device reserves a resource, and the first terminal device determines the first resource based on the resource used by the second terminal device to transmit data, the second information, and the maximum quantity of times that a terminal device reserves a resource. Specifically, the first resource may include a resource 2 and the resource (represented by a resource 1) used by the second terminal device to transmit data. The resource 2 and the resource 1 are separated by M×j in time domain, where j=1, 2, 3, . . . , and L. Herein, L is the maximum quantity of times that a terminal device reserves a resource, and M is a value determined based on the second information. For example, M may be obtained by multiplying a value indicated by the second information by a coefficient P, where P is not 0. The resource 2 may be the same as the resource 1 in frequency, or the resource 2 and the resource 1 have a specific frequency hopping pattern in frequency. The resource 2 includes the resource reserved by the second terminal device to transmit data and the resource determined based on the resource reserved by the second terminal device to transmit data.

In another possible implementation, the second information is used to indicate the set of resource reservation periods that are available to the first terminal device or the second terminal device, and the first terminal device may determine the first resource based on the resource used by the second terminal device to transmit data and the set of resource reservation periods that are available to the first terminal device or the second terminal device.

In this possible implementation, the set of resource reservation periods that are available to the first terminal device or the second terminal device may be configured by a network device. In this case, the second information may be sent by the network device. Alternatively, the set of resource reservation periods that are available to the first terminal device or the second terminal device may be preconfigured. The second information may be specifically a parameter for limiting the resource reservation period. For example, there may be the following three manners.

Manner 1: The first resource may include a resource 2 and the resource (represented by a resource 1) used by the second terminal device to transmit data. The resource 2 and the resource 1 are separated by M in time domain. Herein, M is a set of values determined based on the second information. For example, M may be a set of values obtained by multiplying each value indicated by the second information by a coefficient P, and P is not 0. The resource 2 may be the same as the resource 1 in frequency, or the resource 2 and the resource 1 have a specific frequency hopping pattern in frequency. The resource 2 is the resource determined based on the resource used by the second terminal device to transmit data.

Figure 4:
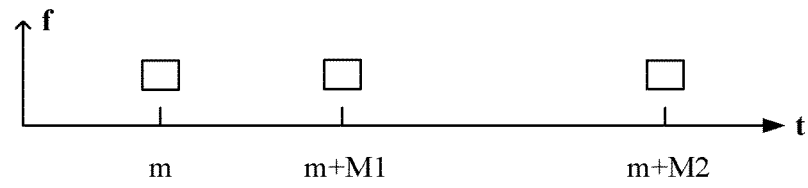
FIG. 4 is a schematic diagram of another first resource according to an embodiment of this application.

For example, the values indicated by the second information include I1 and I2. Therefore, the set M includes: I1×P=M1, and I2×P=M2. FIG. 4 is a schematic diagram of another first resource according to an embodiment of this application. A resource in a subframe m is the resource (the resource 1) used by the second terminal device to transmit data, and the resource 2 is resources that are in a subframe m+M1 and a subframe m+M2 and that have the same frequency as the resource 1.

Manner 2: The first resource may include a resource 2 and the resource (represented by a resource 1) used by the second terminal device to transmit data. The resource 2 and the resource 1 are separated by M×j in time domain, where j=1, 2, 3, . . . . Herein, M is a set of values determined based on the second information. For example, M may be a set of values obtained by multiplying each value indicated by the second information by a coefficient P, and P is not 0. The resource 2 may be the same as the resource 1 in frequency, or the resource 2 and the resource 1 have a specific frequency hopping pattern in frequency. The resource 2 is the resource determined based on the resource used by the second terminal device to transmit data.

Manner 3: A network device may configure a maximum quantity of times that a terminal device reserves a resource, and the first terminal device determines the first resource based on the resource used by the second terminal device to transmit data, the second information, and the maximum quantity of times that a terminal device reserves a resource. Specifically, the first resource may include a resource 2 and the resource (represented by a resource 1) used by the second terminal device to transmit data. The resource 2 and the resource 1 are separated by M×j in time domain, where j=1, 2, 3, . . . , and L. Herein, L is the maximum quantity of times that a terminal device reserves a resource, and M is a set of values determined based on the second information. For example, M may be a set of values obtained by multiplying each value indicated by the second information by a coefficient P, and P is not 0. The resource 2 may be the same as the resource 1 in frequency, or the resource 2 and the resource 1 have a specific frequency hopping pattern in frequency. The resource 2 is the resource determined based on the resource used by the second terminal device to transmit data.

In another possible implementation, the second information indicates a value range of the first parameter, and the first terminal device may determine the first resource based on the resource used by the second terminal device to transmit data and the value range of the first parameter.

The first parameter may include one or more of values in the value range of the first parameter. The first parameter is used to indicate the set of resource reservation periods that are available to the first terminal device or the second terminal device. A terminal device may indicate, in a control information, a resource reservation period used by the terminal device. The first parameter may be configured by the network device, or may be preconfigured. The first parameter may be a parameter for limiting the resource reservation period. For example, there may be the following three manners.

Manner 1: The first resource may include a resource 2 and the resource (represented by a resource 1) used by the second terminal device to transmit data. The resource 2 and the resource 1 are separated by M in time domain. Herein, M is a set of values determined based on the value range of the first parameter. For example, M may be a set of values obtained by multiplying each value in the value range of the first parameter by a coefficient P, and P is not 0. The resource 2 may be the same as the resource 1 in frequency, or the resource 2 and the resource 1 have a specific frequency hopping pattern in frequency. The resource 2 is the resource determined based on the resource used by the second terminal device to transmit data.

Figure 5:
FIG. 5 is a schematic diagram of still another first resource according to an embodiment of this application.

For example, the value range of the first parameter includes: I1, I2, and I3. Therefore, the set M includes: I1×P=M1, I2×P=M2, and I3×P=M3. FIG. 5 is a schematic diagram of still another first resource according to an embodiment of this application. A resource in a subframe m is the resource (the resource 1) used by the second terminal device to transmit data, and the resource 2 is resources that are in a subframe m+M1, a subframe m+M2, and a subframe m+M3 and that have the same frequency as the resource 1.

Manner 2: The first resource may include a resource 2 and the resource (represented by a resource 1) used by the second terminal device to transmit data. The resource 2 and the resource 1 are separated by M×j in time domain, where j=1, 2, 3, . . . . Herein, M is a set of values determined based on the value range of the first parameter. For example, M may be a set of values obtained by multiplying each value in the value range of the first parameter by a coefficient P, and P is not 0. The resource 2 may be the same as the resource 1 in frequency, or the resource 2 and the resource 1 have a specific frequency hopping pattern in frequency. The resource 2 is the resource determined based on the resource used by the second terminal device to transmit data.

Manner 3: A network device may configure a maximum quantity of times that a terminal device reserves a resource, and the first terminal device determines the first resource based on the resource used by the second terminal device to transmit data, the value range of the first parameter, and the maximum quantity of times that a terminal device reserves a resource. Specifically, the first resource may include a resource 2 and the resource (represented by a resource 1) used by the second terminal device to transmit data. The resource 2 and the resource 1 are separated by M×j in time domain, where j=1, 2, 3, . . . , and L. Herein, L is the maximum quantity of times that a terminal device reserves a resource, and M is a set of values determined based on the value range of the first parameter. For example, M may be a set of values obtained by multiplying each value in the value range of the first parameter by a coefficient P, and P is not 0. The resource 2 may be the same as the resource 1 in frequency, or the resource 2 and the resource 1 have a specific frequency hopping pattern in frequency. The resource 2 is the resource determined based on the resource used by the second terminal device to transmit data.

It should be noted that there is no sequence between S201 and S202. S201 may be performed before S202, or S202 may be performed before S201. Certainly, S201 and S202 may alternatively be performed simultaneously. In this embodiment of this application, that S201 is performed before S202 is merely used as an example for description. However, it does not indicate that this embodiment of this application is limited thereto.

S203: If the first resource and the second resource overlap, the first terminal device does not use the second resource, or the first terminal device reselects a resource.

The second resource includes one or more of a resource selected by the first terminal device to transmit data, a candidate resource to be used by the first terminal device to transmit data, a resource determined based on the resource selected by the first terminal device to transmit data, and a resource determined based on the candidate resource to be used by the first terminal device to transmit data. Specifically, when the first terminal device has selected a resource, the second resource may be the resource selected by the first terminal device to transmit data, and/or the resource determined based on the resource selected by the first terminal device to transmit data. When the first terminal device is to select or is selecting a resource, the second resource may be the candidate resource to be used to transmit data, and/or the resource determined based on the candidate resource to be used by the first terminal device to transmit data.

It should be noted that overlapping herein may be partial overlapping, or may be completely overlapping. That the first resource and the second resource overlap may be that the first resource and the second resource overlap in time domain, or may be that the first resource and the second resource overlap in frequency domain, or certainly, may be that the first resource and the second resource overlap in both time domain and frequency domain.

It should be noted that, that the first terminal device does not use the second resource may be understood as that the first terminal device discards data transmission performed on the second resource or the first terminal device does not select the second resource for data transmission. Specifically, when the first terminal device has selected the second resource, that the first terminal device does not use the second resource may be understood as that the first terminal device discards data transmission performed on the second resource. When the first terminal device is to select or is selecting a resource, that the first terminal device does not use the second resource may be understood as that the first terminal device does not select the second resource for data transmission.

It should be noted that any one of the resource selected by the first terminal device to transmit data, the candidate resource to be used by the first terminal device to transmit data, the resource determined based on the resource selected by the first terminal device to transmit data, and the resource determined based on the candidate resource to be used by the first terminal device to transmit data may include one or more resources. Optionally, any one of the resource selected by the first terminal device to transmit data, the candidate resource to be used by the first terminal device to transmit data, the resource determined based on the resource selected by the first terminal device to transmit data, and the resource determined based on the candidate resource to be used by the first terminal device to transmit data may be resources in a group of periodic subframes and that are the same in frequency domain. Alternatively, any one of the resource selected by the first terminal device to transmit data, the candidate resource to be used by the first terminal device to transmit data, the resource determined based on the resource selected by the first terminal device to transmit data, and the resource determined based on the candidate resource to be used by the first terminal device to transmit data may be resources in a group of periodic subframes and that have a specific frequency hopping pattern in frequency domain.

The resource determined based on the resource selected by the first terminal device to transmit data may be determined based on a resource reservation interval of the first terminal device and the resource selected by the first terminal device to transmit data. The resource determined based on the candidate resource to be used by the first terminal device to transmit data may be determined based on the resource reservation interval of the first terminal device and the candidate resource to be used by the first terminal device to transmit data.

Figure 6:
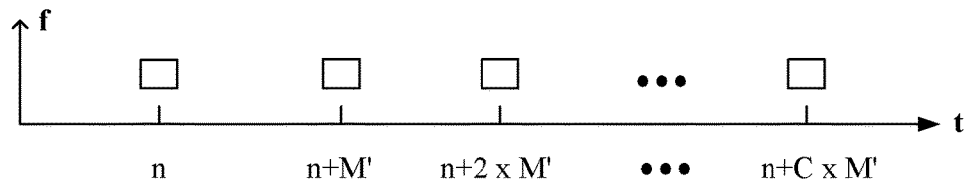
FIG. 6 is a schematic diagram of a resource determined based on a resource that is selected by a first terminal device to transmit data according to an embodiment of this application.

In one embodiment, the resource (represented by a resource 2) determined based on the resource selected by the first terminal device to transmit data and the resource (represented by a resource 1) selected by the first terminal device to transmit data are separated by M'×j in time domain, where j=1, 2, 3, . . . , and C. Herein, C is a quantity of resources reserved by the first terminal device, and M' is the resource reservation interval of the first terminal device. The resource 2 may be the same as the resource 1 in frequency, or the resource 2 and the resource 1 have a specific frequency hopping pattern in frequency. FIG. 6 is a schematic diagram of a resource determined based on a resource selected by a first terminal device to transmit data according to an embodiment of this application. One resource in a subframe n is the resource (the resource 1) selected by the first terminal device to transmit data, and the resource 2 is a resource that is in a subframe n+M'×j and that has the same frequency as the resource 1, where j=1, 2, 3, . . . , and C.

In one embodiment, the resource (represented by a resource 2) determined based on the candidate resource to be used by the first terminal device to transmit data and the candidate resource (represented by a resource 1) to be used by the first terminal device to transmit data are separated by M'×j in time domain, where j=1, 2, 3, . . . , and C. Herein, C is a quantity of resources reserved by the first terminal device, and M' is the resource reservation interval of the first terminal device. The resource 2 may be the same as the resource 1 in frequency, or the resource 2 and the resource 1 have a specific frequency hopping pattern in frequency. Referring to FIG. 6, one resource in a subframe n is the candidate resource (the resource 1) to be used by the first terminal device to transmit data, and the resource 2 is a resource that is in a subframe n+M'×j and that has the same frequency as the resource 1, where j=1, 2, 3, . . . , and C.

Figure 7:
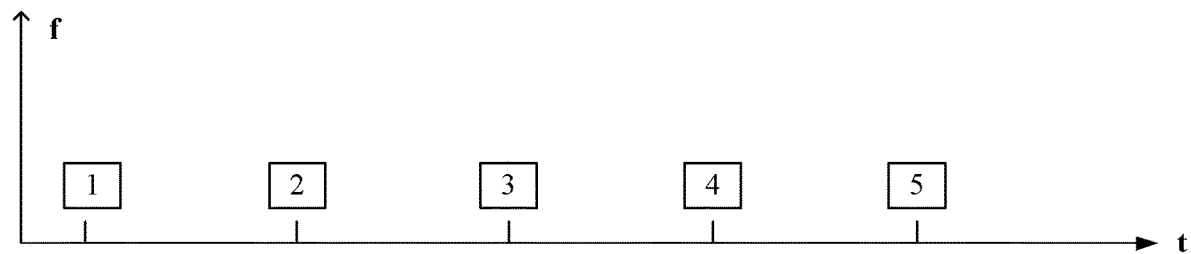
FIG. 7 is a schematic diagram of resource overlapping according to an embodiment of this application.

To describe the second resource more clearly, for example, FIG. 7 is a schematic diagram of resource overlapping according to an embodiment of this application. It is assumed that the first resource determined by the first terminal device is a resource 1, a resource 2, and a resource 3; the candidate resource to be used by the first terminal device to transmit data is the resource 2; and resources determined based on the candidate resource to be used by the first terminal device to transmit data are the resource 3 and a resource 4. Therefore, overlapped resources are the resource 2 and the resource 3. In other word, the second resource is the second resource is the resource 2 and the resource 3.

The embodiments of this application provide a resource selection method and a terminal device. The method includes: determining, by a first terminal device, a first resource, where the first resource includes one or more of a resource used by a second terminal device to transmit data, a resource reserved by the second terminal device to transmit data, a resource determined based on the resource used by the second terminal device to transmit data, and a resource determined based on the resource reserved by the second terminal device to transmit data; and skipping, by the first terminal device, using a second resource, or reselecting, by the first terminal device, a resource, if the first resource and the second resource overlap, where the second resource includes one or more of a resource selected by the first terminal device to transmit data, a candidate resource to be used by the first terminal device to transmit data, a resource determined based on the resource selected by the first terminal device to transmit data, and a resource determined based on the candidate resource to be used by the first terminal device to transmit data. It can be learned that when the first terminal device has selected the resource or is selecting the resource, the first terminal device first determines a first resource corresponding to the second terminal device, to determine whether the first resource overlaps the resource selected by the first terminal device or the candidate resource of the first terminal device. If the first resource overlaps the resource selected by the first terminal device or the candidate resource of the first terminal device, the first terminal device does not use the overlapped second resource, or the first terminal device reselects a resource. In this way, a problem that there is a resource conflict between terminal devices when a resource in a resource pool is a shared resource is resolved.

Optionally, that if the first resource and the second resource overlap, the first terminal device does not use the second resource, or the first terminal device reselects a resource in S203 may include:

skipping, by the first terminal device, using the second resource, or reselecting, by the first terminal device, a resource, if the first resource and the second resource overlap, and a preset condition is met, where the preset condition includes one or more of the following:

a receive power at which the first terminal device receives a signal sent by the second terminal device, a priority of transmission data of the first terminal device and/or a priority of transmission data of the second terminal device, a type of transmission data of the first terminal device and/or a type of transmission data of the second terminal device, a quantity of times that the first terminal device transmits data and/or a quantity of times that the second terminal device transmits data, and a quantity of second resources.

The following describes in detail how the first terminal device determines, based on the preset condition, not to use the second resource, or to reselect a resource.

In a first possible implementation, when the preset condition is the receive power at which the first terminal device receives the signal sent by the second terminal device, and the skipping, by the first terminal device, using the second resource, or reselecting, by the first terminal device, a resource may include:

skipping, by the first terminal device, using the second resource, or reselecting, by the first terminal device, a resource, if the first resource and the second resource overlap, and the receive power at which the first terminal device receives the signal sent by the second terminal device is greater than or equal to a first threshold.

The first threshold may be set based on an actual requirement. Herein, a setting of the first threshold is not further limited in this embodiment of this application. The signal sent by the second terminal device may be a reference signal sent by the second terminal device. Further, the signal sent by the second terminal device may be a reference signal that is sent by the second terminal device and that is on a channel used to transmit data.

In the first possible implementation, when the receive power at which the first terminal device receives the signal sent by the second terminal device is greater than or equal to the first threshold, it indicates that the first terminal device is relatively close to the second terminal device. If the two terminal devices simultaneously transmit data on the second resource, a receiving performance of a terminal device that receives a signal of the first terminal device and a receiving performance of a terminal device that receives a signal of the second terminal device may deteriorate. Therefore, the first terminal device may not use the second resource, or the first terminal device reselects a resource.

In a second possible implementation, there may be two cases: data having a higher priority is preferentially transmitted, or data having a lower priority is preferentially transmitted. In a case in which the data having a higher priority is preferentially transmitted, when the preset condition is the priority of the transmission data of the first terminal device and/or the priority of the transmission data of the second terminal device, and the skipping, by the first terminal device, using the second resource, or reselecting, by the first terminal device, a resource may include:

skipping, by the first terminal device, using the second resource, if the first resource and the second resource overlap, and the priority of the transmission data of the first terminal device is less than or equal to a second threshold; or skipping, by the first terminal device, using the second resource, if the first resource and the second resource overlap, and the priority of the transmission data of the second terminal device is greater than or equal to a third threshold; or skipping, by the first terminal device, using the second resource, if the first resource and the second resource overlap, the priority of the transmission data of the first terminal device is less than or equal to a second threshold, and the priority of the transmission data of the second terminal device is greater than or equal to a third threshold; or reselecting, by the first terminal device, a resource if the first resource and the second resource overlap, and the priority of the transmission data of the first terminal device is greater than a fourth threshold; or reselecting, by the first terminal device, a resource if the first resource and the second resource overlap, and the priority of the transmission data of the second terminal device is greater than or equal to a fifth threshold; or reselecting, by the first terminal device, a resource if the first resource and the second resource overlap, the priority of the transmission data of the first terminal device is greater than a fourth threshold, and the priority of the transmission data of the second terminal device is greater than or equal to a fifth threshold.

In a case in which the data having a lower priority is preferentially transmitted, when the preset condition is the priority of the transmission data of the first terminal device and/or the priority of the transmission data of the second terminal device, and the skipping, by the first terminal device, using the second resource, or reselecting, by the first terminal device, a resource may include:

skipping, by the first terminal device, using the second resource, if the first resource and the second resource overlap, and the priority of the transmission data of the first terminal device is greater than or equal to a second threshold; or skipping, by the first terminal device, using the second resource, if the first resource and the second resource overlap, and the priority of the transmission data of the second terminal device is less than or equal to a third threshold; or skipping, by the first terminal device, using the second resource, if the first resource and the second resource overlap, the priority of the transmission data of the first terminal device is greater than or equal to a second threshold, and the priority of the transmission data of the second terminal device is less than or equal to a third threshold; or reselecting, by the first terminal device, a resource if the first resource and the second resource overlap, and the priority of the transmission data of the first terminal device is less than a fourth threshold; or reselecting, by the first terminal device, a resource if the first resource and the second resource overlap, and the priority of the transmission data of the second terminal device is less than or equal to a fifth threshold; or reselecting, by the first terminal device, a resource if the first resource and the second resource overlap, the priority of the transmission data of the first terminal device is less than a fourth threshold, and the priority of the transmission data of the second terminal device is less than or equal to a fifth threshold.

In the case in which the data having a higher priority is preferentially transmitted, determining, based on a priority of transmission data, that the first terminal device does not use the second resource is described in detail below. When the priority of the transmission data of the first terminal device is less than or equal to the second threshold, it indicates that the transmission data of the first terminal device has a relatively low priority, but in this case, because data having a relatively high priority is preferentially transmitted, the first terminal device does not use the second resource. Alternatively, the first terminal device may determine the priority of the transmission data of the second terminal device. If the priority of the transmission data of the second terminal device is greater than or equal to the third threshold, it indicates that the transmission data of the second terminal device has a high priority, and in this case, the first terminal device does not use the second resource either. Alternatively, when the priority of the transmission data of the first terminal device is less than or equal to the second threshold, and the priority of the transmission data of the second terminal device is greater than or equal to the third threshold, it indicates that the transmission data of the first terminal device has a relatively low priority, and that the transmission data of the second terminal device has a high priority, and in this case, because data having a relatively high priority is preferentially transmitted, the first terminal device does not use the second resource.

On the contrary, in the case in which the data having a lower priority is preferentially transmitted, detailed descriptions are provided below. When the priority of the transmission data of the first terminal device is greater than or equal to the second threshold, it indicates that the transmission data of the first terminal device has a relatively high priority, but in this case, because data having a relatively low priority is preferentially transmitted, the first terminal device does not use the second resource. Alternatively, the first terminal device may determine the priority of the transmission data of the second terminal device. If the priority of the transmission data of the second terminal device is less than or equal to the third threshold, it indicates that the transmission data of the second terminal device has a low priority, and in this case, the first terminal device does not use the second resource either. Alternatively, when the priority of the transmission data of the first terminal device is greater than or equal to the second threshold, and the priority of the transmission data of the second terminal device is less than or equal to the third threshold, it indicates that the transmission data of the first terminal device has a relatively high priority, and that the transmission data of the second terminal device has a low priority, and in this case, because data having a relatively low priority is preferentially transmitted, the first terminal device does not use the second resource.

The second threshold and the third threshold may be set based on an actual requirement. Herein, a setting of the second threshold and the third threshold is not further limited in this embodiment of this application. Optionally, the second threshold may be equal to the third threshold.

In the case in which the data having a higher priority is preferentially transmitted, reselecting a resource based on a priority of transmission data is described in detail below. When the priority of the transmission data of the first terminal device is greater than the fourth threshold, it indicates that the first terminal device has a relatively high priority, and in this case, the first terminal device may reselect a resource, to transmit data on the reselected resource. Alternatively, the first terminal device may determine the priority of the transmission data of the second terminal device. If the priority of the transmission data of the second terminal device is greater than or equal to the fifth threshold, it indicates that the transmission data of the second terminal device has a relatively high priority, and in this case, the first terminal device may reselect a resource, to transmit data on the reselected resource. Alternatively, if the first terminal device determines that the priority of the transmission data of the first terminal device is greater than the fourth threshold, and the priority of the transmission data of the second terminal device is greater than or equal to the fifth threshold, it indicates that the transmission data of the first terminal device has a relatively high priority, and that the transmission data of the second terminal device has a relatively high priority, and in this case, to avoid mutual affect, the first terminal device may reselect a resource, to transmit data on the reselected resource.

On the contrary, in the case in which the data having a lower priority is preferentially transmitted, detailed descriptions are provided below. When the priority of the transmission data of the first terminal device is less than the fourth threshold, it indicates that the first terminal device has a relatively low priority, and in this case, the first terminal device may reselect a resource, to transmit data on the reselected resource. Alternatively, the first terminal device may determine the priority of the transmission data of the second terminal device. If the priority of the transmission data of the second terminal device is less than or equal to the fifth threshold, it indicates that the transmission data of the second terminal device has a relatively low priority, and in this case, the first terminal device may reselect a resource, to transmit data on the reselected resource. Alternatively, if the first terminal device determines that the priority of the transmission data of the first terminal device is less than the fourth threshold, and the priority of the transmission data of the second terminal device is less than or equal to the fifth threshold, it indicates that the transmission data of the first terminal device has a relatively low priority, and that the transmission data of the second terminal device has a relatively low priority, and in this case, to avoid mutual affect, the first terminal device may reselect a resource, to transmit data on the reselected resource.

The fourth threshold and the fifth threshold may be set based on an actual requirement. Herein, a setting of the fourth threshold and the fifth threshold is not further limited in this embodiment of this application. Optionally, the fourth threshold may be equal to the fifth threshold. It should be noted that in this embodiment of this application, the fourth threshold may be equal to the second threshold, and the fifth threshold may be equal to the third threshold.

In a third possible implementation, there may be two cases: data having a higher priority is preferentially transmitted, or data having a lower priority is preferentially transmitted.

In a case in which the data having a higher priority is preferentially transmitted, when the preset condition is the priority of the transmission data of the first terminal device or the priority of the transmission data of the second terminal device, and the skipping, by the first terminal device, using the second resource, or reselecting, by the first terminal device, a resource may further include:

skipping, by the first terminal device, using the second resource, or reselecting, by the first terminal device, a resource, if the first resource and the second resource overlap, and a difference between the priority of the transmission data of the first terminal device and the priority of the transmission data of the second terminal device is less than or equal to a sixth threshold.

The sixth threshold may be set based on an actual requirement. Herein, a setting of the sixth threshold is not further limited in this embodiment of this application.

In the third possible implementation, the first terminal device may first determine the priority of the transmission data of the first terminal device and the priority of the transmission data of the second terminal device, determine the difference between the priority of the transmission data of the first terminal device and the priority of the transmission data of the second terminal device, and determine, based on the difference, whether the first terminal device is to use the second resource or is to reselect a resource. Specifically, if the difference between the priority of the transmission data of the first terminal device and the priority of the transmission data of the second terminal device is less than or equal to the sixth threshold, the first terminal device does not use the second resource, or the first terminal device reselects a resource.

In a case in which the data having a lower priority is preferentially transmitted, when the preset condition is the priority of the transmission data of the first terminal device or the priority of the transmission data of the second terminal device, and the skipping, by the first terminal device, using the second resource, or reselecting, by the first terminal device, a resource may further include:

If the first resource and the second resource overlap, and the difference between the priority of the transmission data of the first terminal device and the priority of the transmission data of the second terminal device is greater than or equal to the sixth threshold, the first terminal device does not use the second resource, or the first terminal device reselects a resource.

The sixth threshold may be set based on an actual requirement. Herein, a setting of the sixth threshold is not further limited in this embodiment of this application.

In the third possible implementation, the first terminal device may first determine the priority of the transmission data of the first terminal device and the priority of the transmission data of the second terminal device, determine the difference between the priority of the transmission data of the first terminal device and the priority of the transmission data of the second terminal device, and determine, based on the difference, whether the first terminal device is to use the second resource or is to reselect a resource. Specifically, if the difference between the priority of the transmission data of the first terminal device and the priority of the transmission data of the second terminal device is greater than or equal to the sixth threshold, the first terminal device does not use the second resource, or the first terminal device reselects a resource.

In a fourth possible implementation, when the preset condition is the type of the transmission data of the first terminal device and/or the type of the transmission data of the second terminal device, and the skipping, by the first terminal device, using the second resource, or reselecting, by the first terminal device, a resource may include:

skipping, by the first terminal device, using the second resource, if the first resource and the second resource overlap, and the transmission data of the first terminal device is non-security-related data; or skipping, by the first terminal device, using the second resource, if the first resource and the second resource overlap, and the transmission data of the second terminal device is security-related data; or skipping, by the first terminal device, using the second resource, if the first resource and the second resource overlap, the transmission data of the first terminal device is non-security-related data, and the transmission data of the second terminal device is security-related data; or reselecting, by the first terminal device, a resource if the first resource and the second resource overlap, and the transmission data of the first terminal device is security-related data; or reselecting, by the first terminal device, a resource if the first resource and the second resource overlap, and the transmission data of the second terminal device is security-related data; or reselecting, by the first terminal device, a resource if the first resource and the second resource overlap, the transmission data of the first terminal device is security-related data, and the transmission data of the second terminal device is security-related data.

In the fourth possible implementation, if the transmission data of the first terminal device is non-security-related data, the first terminal device does not use the second resource; or if the transmission data of the second terminal device is security-related data, the first terminal device does not use the second resource either; or if the transmission data of the first terminal device is non-security-related data, and the transmission data of the second terminal device is security-related data, the first terminal device does not use the second resource either.

If the transmission data of the first terminal device is security-related data, the first terminal device reselects a resource; or if the transmission data of the second terminal device is security-related data, the first terminal device reselects a resource; or if the transmission data of the first terminal device is security-related data, and the transmission data of the second terminal device is security-related data, the first terminal device reselects a resource.

In a fifth possible implementation, the preset condition includes the quantity of times that the first terminal device transmits the data and/or the quantity of times that the second terminal device transmits the data, and the skipping, by the first terminal device, using the second resource, or reselecting, by the first terminal device, a resource may include:

skipping, by the first terminal device, using the second resource, if the first resource and the second resource overlap, and the transmission data of the first terminal device is retransmission data; or skipping, by the first terminal device, using the second resource, if the first resource and the second resource overlap, and the transmission data of the second terminal device is initial transmission data; or skipping, by the first terminal device, using the second resource, if the first resource and the second resource overlap, the transmission data of the first terminal device is retransmission data, and the transmission data of the second terminal device is initial transmission data; or reselecting, by the first terminal device, a resource if the first resource and the second resource overlap, and the transmission data of the first terminal device is initial transmission data; or reselecting, by the first terminal device, a resource if the first resource and the second resource overlap, and the transmission data of the second terminal device is initial transmission data; or reselecting, by the first terminal device, a resource if the first resource and the second resource overlap, the transmission data of the first terminal device is initial transmission data, and the transmission data of the second terminal device is initial transmission data.

In the fifth possible implementation, if the transmission data of the first terminal device is retransmission data, the first terminal device does not use the second resource; or if the transmission data of the second terminal device is initial transmission data, the first terminal device does not use the second resource either; or if the transmission data of the first terminal device is retransmission data, and the transmission data of the second terminal device is initial transmission data, the first terminal device does not use the second resource either.

If the transmission data of the first terminal device is initial transmission data, the first terminal device reselects a resource; or if the transmission data of the second terminal device is initial transmission data, the first terminal device reselects a resource; or if the transmission data of the first terminal device is initial transmission data, and the transmission data of the second terminal device is initial transmission data, the first terminal device reselects a resource.

In a fifth possible implementation, the preset condition is the quantity of second resources, and the skipping, by the first terminal device, using the second resource, or reselecting, by the first terminal device, a resource may include:

skipping, by the first terminal device, using the second resource, if the first resource and the second resource overlap, and the quantity of second resources is less than or equal to a seventh threshold; or skipping, by the first terminal device, using the second resource, if the first resource and the second resource overlap, and a quantity of subframes in which the second resource is located is less than or equal to an eighth threshold; or reselecting, by the first terminal device, a resource if the first resource and the second resource overlap, and the quantity of second resources is greater than a ninth threshold; or reselecting, by the first terminal device, a resource if the first resource and the second resource overlap, and a quantity of subframes in which the second resource is located is greater than a tenth threshold.

The seventh threshold, the eighth threshold, and the ninth threshold may be set based on an actual requirement. Herein, a setting of the seventh threshold, the eighth threshold, and the ninth threshold is not further limited in this embodiment of this application. It should be noted that in this embodiment of this application, the seventh threshold may be equal to the ninth threshold, and the eighth threshold may be equal to the tenth threshold.

Figure 8:
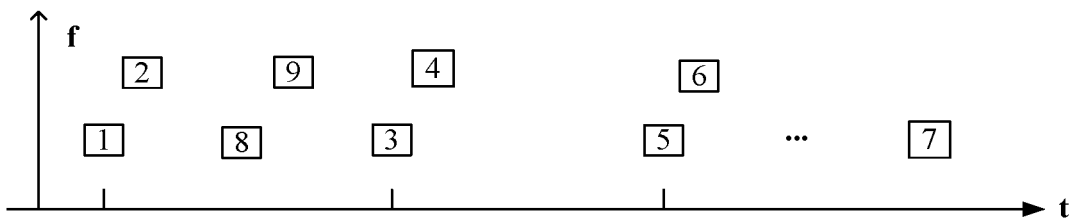
FIG. 8 is another schematic diagram of reselecting a resource by a first terminal device according to an embodiment of this application.

FIG. 8 is another schematic diagram of reselecting a resource by a first terminal device according to an embodiment of this application. A resource 1 and the resource 2 are resources selected by the first terminal device to transmit data, and a resource 3, a resource 4, a resource 5, a resource 6, and a resource 7 are resources determined based on the resources selected by the first terminal device to transmit data. Transmission performed by the first terminal device on the resource 1, the resource 3, the resource 5, and the resource 7 is initial transmission. Transmission performed by the first terminal device on the resource 2, the resource 4, and the resource 6 is initial transmission. A resource 8 is a resource used by a second terminal device to transmit data, and the resource 7 is a resource reserved by the second terminal device to transmit data. A resource 9 is a resource used by the second terminal device to transmit data, and the resource 4 is a resource reserved by the second terminal device to transmit data. In other words, first resources include the resource 8, the resource 7, the resource 9, and the resource 4. Second resources are the resource 4 and the resource 7, and overlap the first resources. Because transmission performed by the first terminal device on the resource 4 is retransmission, the first terminal device does not use the resource 4. Because transmission performed by the first terminal device on the resource 7 is initial transmission, the first terminal device reselects a resource.

Figure 9:
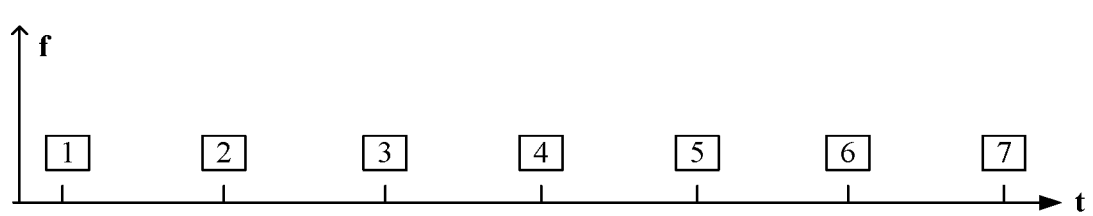
FIG. 9 is still another schematic diagram of reselecting a resource by a first terminal device according to an embodiment of this application.

For example, FIG. 9 is still another schematic diagram of reselecting a resource by a first terminal device according to an embodiment of this application. A resource 1 is a resource selected by the first terminal device to transmit data. A resource 2, a resource 3, a resource 4, a resource 5, a resource 6, and a resource 7 are resources determined based on the resource selected by the first terminal device to transmit data. The resource 2, the resource 4, and the resource 6 are first resources. Second resources include the resource 2, the resource 4, and the resource 6, and overlap the first resources. It is assumed that the seventh threshold is 4. Because the quantity of second resources is 3, and is less than the seventh threshold, the first terminal device does not use the resource 2, the resource 4, or the resource 6.

Figure 10:
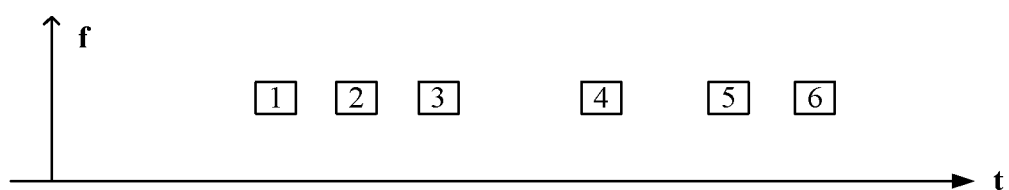
FIG. 10 is a schematic diagram of reselecting a resource by a first terminal device according to an embodiment of this application.

In the foregoing plurality of possible implementations, when the first terminal device needs to reselect a resource, a moment at which the first terminal device reselects a resource may be before a subframe in which a third resource is located, and the third resource is the $1^{st}$ resource in the second resource that triggers the first terminal device to reselect a resource; and/or the moment at which the first terminal device selects the resource is after a subframe in which a fourth resource is located, the fourth resource is the last resource before the third resource in a fifth resource, and the fifth resource includes one or more of the resource selected by the first terminal device to transmit data, the candidate resource to be used by the first terminal device to transmit data, the resource determined based on the resource selected by the first terminal device to transmit data, and the resource determined based on the candidate resource to be used by the first terminal device to transmit data. FIG. 10 is a schematic diagram of reselecting a resource by a first terminal device according to an embodiment of this application. A resource 1, a resource 3, a resource 4, and a resource 5 are resources determined based on the resource selected by the first terminal device to transmit data, and the resource 2 and the resource 5 are first resources. Therefore, the resource 5 is a second resource. Assuming that the first terminal device determines that the first resource and the second resource overlap, the first terminal device reselects a resource. In this case, the moment at which the first terminal device reselects a resource is before the resource 5, and/or the moment at which the first terminal device reselects a resource is after the resource 4.

Optionally, in the foregoing plurality of possible implementations, the moment at which the first terminal device reselects a resource is not limited. For example, the first terminal device may reselect a resource before the fourth resource. The first terminal device uses the reselected resource after the fourth resource.

Optionally, the moment at which the first terminal device reselects a resource is after a moment at which a data packet that should have been transmitted by the first terminal device on the third resource arrives at a logical channel.

It should be noted that, in the foregoing six possible implementations, a combination of two possible implementations may also be used to determine that the first terminal device does not use the second resource, or that the first terminal device reselects a resource. Details are as follows:

When the first possible implementation is combined with the second possible implementation, the first terminal device does not use the second resource if the first resource and the second resource overlap, and the receive power at which the first terminal device receives the signal sent by the second terminal device is greater than the first threshold; and if the first resource and the second resource overlap, and the priority of the transmission data of the first terminal device is less than or equal to the second threshold and/or the priority of the transmission data of the second terminal device is greater than or equal to the third threshold. Alternatively, the first terminal device reselects a resource if the first resource and the second resource overlap, the receive power at which the first terminal device receives the signal sent by the second terminal device is greater than the first threshold, and the priority of the transmission data of the first terminal device is greater than the fourth threshold and/or the priority of the transmission data of the second terminal device is greater than or equal to the fifth threshold.

When the first possible implementation is combined with the third possible implementation, the first terminal device does not use the second resource, or the first terminal device reselects a resource, if the first resource and the second resource overlap, the receive power at which the first terminal device receives the signal sent by the second terminal device is greater than the first threshold, and the difference between the priority of the transmission data of the first terminal device and the priority of the transmission data of the second terminal device is less than or equal to the sixth threshold.

When the first possible implementation is combined with the fourth possible implementation, the first terminal device does not use the second resource if the first resource and the second resource overlap, the receive power at which the first terminal device receives the signal sent by the second terminal device is greater than the first threshold, and the transmission data of the first terminal device is non-security-related data and/or the transmission data of the second terminal device is security-related data. Alternatively, the first terminal device reselects a resource if the first resource and the second resource overlap, the receive power at which the first terminal device receives the signal sent by the second terminal device is greater than the first threshold, and the transmission data of the first terminal device is security-related data and/or the transmission data of the second terminal device is security-related data.

When the first possible implementation is combined with the fifth possible implementation, the first terminal device does not use the second resource if the first resource and the second resource overlap, the receive power at which the first terminal device receives the signal sent by the second terminal device is greater than the first threshold, and the transmission data of the first terminal device is retransmission data and/or the transmission data of the second terminal device is initial transmission data. Alternatively, the first terminal device reselects a resource if the first resource and the second resource overlap, the receive power at which the first terminal device receives the signal sent by the second terminal device is greater than the first threshold, and the transmission data of the first terminal device is initial transmission data and/or the transmission data of the second terminal device is initial transmission data.

When the first possible implementation is combined with the sixth possible implementation, the first terminal device does not use the second resource if the first resource and the second resource overlap, the receive power at which the first terminal device receives the signal sent by the second terminal device is greater than the first threshold, and the quantity of second resources is less than or equal to the seventh threshold. Alternatively, the first terminal device does not use the second resource if the first resource and the second resource overlap, the receive power at which the first terminal device receives the signal sent by the second terminal device is greater than the first threshold, and the quantity of subframes in which the second resource is located is less than or equal to the eighth threshold. Alternatively, the first terminal device reselects a resource if the first resource and the second resource overlap, the receive power at which the first terminal device receives the signal sent by the second terminal device is greater than the first threshold, and the quantity of second resources is greater than the ninth threshold. Alternatively, the first terminal device reselects a resource if the first resource and the second resource overlap, the receive power at which the first terminal device receives the signal sent by the second terminal device is greater than the first threshold, and the quantity of subframes in which the second resource is located is greater than the tenth threshold.

When the second possible implementation is combined with the fourth possible implementation, the first terminal device does not use the second resource if the first resource and the second resource overlap, and the priority of the transmission data of the first terminal device is less than or equal to the second threshold and/or the priority of the transmission data of the second terminal device is greater than or equal to the third threshold; and the first terminal device does not use the second resource if the transmission data of the first terminal device is non-security-related data and/or the transmission data of the second terminal device is security-related data. Alternatively, the first terminal device reselects a resource if the first resource and the second resource overlap, the priority of the transmission data of the first terminal device is greater than the fourth threshold and/or the priority of the transmission data of the second terminal device is greater than or equal to the fifth threshold, and the transmission data of the first terminal device is security-related data and/or the transmission data of the second terminal device is security-related data.

When the second possible implementation is combined with the fifth possible implementation, the first terminal device does not use the second resource if the first resource and the second resource overlap, the priority of the transmission data of the first terminal device is less than or equal to the second threshold and/or the priority of the transmission data of the second terminal device is greater than or equal to the third threshold, and the transmission data of the first terminal device is retransmission data and/or the transmission data of the second terminal device is initial transmission data. Alternatively, the first terminal device reselects a resource if the first resource and the second resource overlap, the priority of the transmission data of the first terminal device is greater than the fourth threshold and/or the priority of the transmission data of the second terminal device is greater than or equal to the fifth threshold, and the transmission data of the first terminal device is initial transmission data and/or the transmission data of the second terminal device is initial transmission data.

When the second possible implementation is combined with the sixth possible implementation, the first terminal device does not use the second resource if the first resource and the second resource overlap, and the priority of the transmission data of the first terminal device is less than or equal to the second threshold and/or the priority of the transmission data of the second terminal device is greater than or equal to the third threshold; and the first terminal device does not use the second resource if the quantity of second resources is less than or equal to the seventh threshold. Alternatively, the first terminal device does not use the second resource if the first resource and the second resource overlap, the priority of the transmission data of the first terminal device is less than or equal to the second threshold and/or the priority of the transmission data of the second terminal device is greater than or equal to the third threshold, and the quantity of subframes in which the second resource is located is less than or equal to the eighth threshold. Alternatively, the first terminal device reselects a resource if the first resource and the second resource overlap, the priority of the transmission data of the first terminal device is greater than the fourth threshold and/or the priority of the transmission data of the second terminal device is greater than or equal to the fifth threshold, and the quantity of second resources is greater than the ninth threshold. Alternatively, the first terminal device reselects a resource if the first resource and the second resource overlap, the priority of the transmission data of the first terminal device is greater than the fourth threshold and/or the priority of the transmission data of the second terminal device is greater than or equal to the fifth threshold, and the quantity of subframes in which the second resource is located is greater than the tenth threshold.

When the third possible implementation is combined with the fourth possible implementation, the first terminal device does not use the second resource if the first resource and the second resource overlap, the difference between the priority of the transmission data of the first terminal device and the priority of the transmission data of the second terminal device is less than or equal to the sixth threshold, and the transmission data of the first terminal device is non-security-related data and/or the transmission data of the second terminal device is security-related data. Alternatively, the first terminal device reselects a resource if the first resource and the second resource overlap, the difference between the priority of the transmission data of the first terminal device and the priority of the transmission data of the second terminal device is less than or equal to the sixth threshold, and the transmission data of the first terminal device is security-related data and/or the transmission data of the second terminal device is security-related data.

When the third possible implementation is combined with the fifth possible implementation, the first terminal device does not use the second resource if the first resource and the second resource overlap, the difference between the priority of the transmission data of the first terminal device and the priority of the transmission data of the second terminal device is less than or equal to the sixth threshold, and the transmission data of the first terminal device is retransmission data and/or the transmission data of the second terminal device is initial transmission data. Alternatively, the first terminal device reselects a resource if the first resource and the second resource overlap, the difference between the priority of the transmission data of the first terminal device and the priority of the transmission data of the second terminal device is less than or equal to the sixth threshold, and the transmission data of the first terminal device is initial transmission data and/or the transmission data of the second terminal device is initial transmission data.

When the third possible implementation is combined with the sixth possible implementation, the first terminal device does not use the second resource if the first resource and the second resource overlap, the difference between the priority of the transmission data of the first terminal device and the priority of the transmission data of the second terminal device is less than or equal to the sixth threshold, and the quantity of second resources is less than or equal to the seventh threshold. Alternatively, the first terminal device does not use the second resource if the first resource and the second resource overlap, the difference between the priority of the transmission data of the first terminal device and the priority of the transmission data of the second terminal device is less than or equal to the sixth threshold, and the quantity of subframes in which the second resource is located is less than or equal to the eighth threshold. Alternatively, the first terminal device reselects a resource if the first resource and the second resource overlap, the difference between the priority of the transmission data of the first terminal device and the priority of the transmission data of the second terminal device is less than or equal to the sixth threshold, and the quantity of second resources is greater than the ninth threshold. Alternatively, the first terminal device reselects a resource if the first resource and the second resource overlap, the difference between the priority of the transmission data of the first terminal device and the priority of the transmission data of the second terminal device is less than or equal to the sixth threshold, and the quantity of subframes in which the second resource is located is greater than the tenth threshold.

When the fourth possible implementation is combined with the fifth possible implementation, the first terminal device does not use the second resource if the first resource and the second resource overlap, the transmission data of the first terminal device is non-security-related data and/or the transmission data of the second terminal device is security-related data, and the transmission data of the first terminal device is retransmission data and/or the transmission data of the second terminal device is initial transmission data. Alternatively, the first terminal device reselects a resource if the first resource and the second resource overlap, the transmission data of the first terminal device is security-related data and/or the transmission data of the second terminal device is security-related data, and the transmission data of the first terminal device is initial transmission data and/or the transmission data of the second terminal device is initial transmission data.

When the fourth possible implementation is combined with the sixth possible implementation, the first terminal device does not use the second resource if the first resource and the second resource overlap, the transmission data of the first terminal device is non-security-related data and/or the transmission data of the second terminal device is security-related data, and the quantity of second resources is less than or equal to the seventh threshold. Alternatively, the first terminal device does not use the second resource if the first resource and the second resource overlap, the transmission data of the first terminal device is non-security-related data and/or the transmission data of the second terminal device is security-related data, and the quantity of subframes in which the second resource is located is less than or equal to the eighth threshold. Alternatively, the first terminal device reselects a resource if the first resource and the second resource overlap, the transmission data of the first terminal device is security-related data and/or the transmission data of the second terminal device is security-related data, and the quantity of second resources is greater than the ninth threshold. Alternatively, the first terminal device reselects a resource if the first resource and the second resource overlap, the transmission data of the first terminal device is security-related data and/or the transmission data of the second terminal device is security-related data, and the quantity of subframes in which the second resource is located is greater than the tenth threshold.

When the fifth possible implementation is combined with the sixth possible implementation, the first terminal device does not use the second resource if the first resource and the second resource overlap, the transmission data of the first terminal device is retransmission data and/or the transmission data of the second terminal device is initial transmission data, and the quantity of second resources is less than or equal to the seventh threshold. Alternatively, the first terminal device does not use the second resource if the first resource and the second resource overlap, the transmission data of the first terminal device is retransmission data and/or the transmission data of the second terminal device is initial transmission data, and the quantity of subframes in which the second resource is located is less than or equal to the eighth threshold. Alternatively, the first terminal device reselects a resource if the first resource and the second resource overlap, the transmission data of the first terminal device is initial transmission data and/or the transmission data of the second terminal device is initial transmission data, and the quantity of second resources is greater than the ninth threshold. Alternatively, the first terminal device reselects a resource if the first resource and the second resource overlap, the transmission data of the first terminal device is initial transmission data and/or the transmission data of the second terminal device is initial transmission data, and the quantity of subframes in which the second resource is located is greater than the tenth threshold.

It should be noted that in the foregoing six possible implementations, a combination of a plurality of possible implementations may also be used to determine that the first terminal device does not use the second resource, or that the first terminal device reselects a resource. For a combination manner of the plurality of possible manners, refer to a combination manner of the two possible manners. Details are not described herein in this embodiment of this application.

Figure 11:
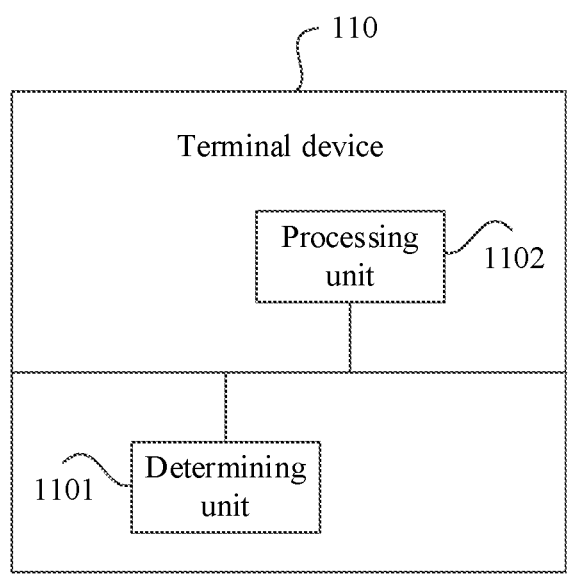
FIG. 11 is a schematic structural diagram of a terminal device according to an embodiment of this application.

FIG. 11 is a schematic structural diagram of a terminal device 110 according to an embodiment of this application. Referring to FIG. 11, the terminal device 110 may include:

a determining unit 1101, configured to determine a first resource, where the first resource includes one or more of a resource used by a second terminal device to transmit data, a resource reserved by the second terminal device to transmit data, a resource determined based on the resource used by the second terminal device to transmit data, and a resource determined based on the resource reserved by the second terminal device to transmit data; and a processing unit 1102, configured to: skip using a second resource, or reselect a resource by the terminal device 110, if the first resource and the second resource overlap, where the second resource includes one or more of a resource selected by the terminal device 110 to transmit data, a candidate resource to be used by the terminal device 110 to transmit data, a resource determined based on the resource selected by the terminal device 110 to transmit data, and a resource determined based on the candidate resource to be used by the terminal device 110 to transmit data.

Figure 12:
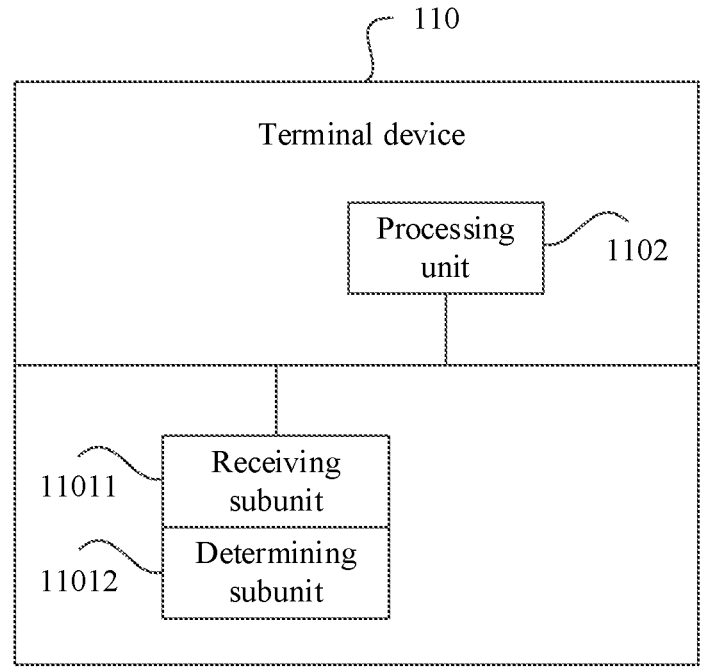
FIG. 12 is a schematic structural diagram of another terminal device according to an embodiment of this application.

Optionally, the determining unit 1101 includes a receiving subunit 11011 and a determining subunit 11012. FIG. 12 is a schematic structural diagram of another terminal device according to an embodiment of this application.

The receiving subunit 11011 is configured to receive first information sent by the second terminal device. The first information is used to indicate the resource used by the second terminal device to transmit data.

The determining subunit 11012 is configured to determine the first resource based on the resource used by the second terminal device to transmit data.

Optionally, the determining subunit 11012 is specifically configured to determine the first resource based on second information and the resource used by the second terminal device to transmit data.

The second information is used to indicate a reservation interval; or the second information is used to indicate a set of resource reservation periods that are available to the terminal device 110 or the second terminal device; or the second information is used to indicate a value range of a first parameter, where the first parameter is used to indicate a set of resource reservation periods that are available to the terminal device 110 or the second terminal device.

Optionally, the processing unit 1102 is specifically configured to: skip using the second resource, or reselect a resource, if the first resource and the second resource overlap, and a preset condition is met. The preset condition includes one or more of the following:

a receive power at which the terminal device 110 receives a signal sent by the second terminal device, a priority of transmission data of the terminal device 110 and/or a priority of transmission data of the second terminal device, a type of transmission data of the terminal device 110 and/or a type of transmission data of the second terminal device, a quantity of times that the terminal device 110 transmits data and/or a quantity of times that the second terminal device transmits data, and a quantity of second resources.

Optionally, the preset condition includes the receive power at which the terminal device 110 receives the signal sent by the second terminal device; and the processing unit 1102 is specifically configured to skip using the second resource, or reselect a resource, if the first resource and the second resource overlap, and the receive power at which the terminal device 110 receives the signal sent by the second terminal device is greater than a first threshold.

Optionally, the preset condition includes the priority of the transmission data of the terminal device 110 or the priority of the transmission data of the second terminal device; and the processing unit 1102 is specifically configured to: skip using the second resource, if the first resource and the second resource overlap, and the priority of the transmission data of the terminal device 110 is less than or equal to a second threshold; or skip using the second resource, if the first resource and the second resource overlap, and the priority of the transmission data of the second terminal device is greater than or equal to a third threshold; or skip using the second resource, if the first resource and the second resource overlap, the priority of the transmission data of the terminal device 110 is less than or equal to a second threshold, and the priority of the transmission data of the second terminal device is greater than or equal to a third threshold; or reselect a resource if the first resource and the second resource overlap, and the priority of the transmission data of the terminal device 110 is greater than a fourth threshold; or reselect a resource if the first resource and the second resource overlap, and the priority of the transmission data of the second terminal device is greater than or equal to a fifth threshold; or reselect a resource if the first resource and the second resource overlap, the priority of the transmission data of the terminal device 110 is greater than a fourth threshold, and the priority of the transmission data of the second terminal device is greater than or equal to a fifth threshold.

Optionally, the preset condition includes the priority of the transmission data of the terminal device 110 and the priority of the transmission data of the second terminal device; and the processing unit 1102 is specifically configured to: skip using the second resource, or reselect a resource, if the first resource and the second resource overlap, and a difference between the priority of the transmission data of the terminal device 110 and the priority of the transmission data of the second terminal device is less than or equal to a sixth threshold.

Optionally, the preset condition includes the type of the transmission data of the terminal device 110 and/or the type of the transmission data of the second terminal device; and the processing unit 1102 is specifically configured to: skip using the second resource, if the first resource and the second resource overlap, and the transmission data of the terminal device 110 is non-security-related data; or skip using the second resource, if the first resource and the second resource overlap, and the transmission data of the second terminal device is security-related data; or skip using the second resource, if the first resource and the second resource overlap, the transmission data of the terminal device 110 is non-security-related data, and the transmission data of the second terminal device is security-related data; or reselect a resource if the first resource and the second resource overlap, and the transmission data of the terminal device 110 is security-related data; or reselect a resource if the first resource and the second resource overlap, and the transmission data of the second terminal device is security-related data; or reselect a resource if the first resource and the second resource overlap, the transmission data of the terminal device 110 is security-related data, and the transmission data of the second terminal device is security-related data.

Optionally, the preset condition includes the quantity of times that the terminal device 110 transmits the data and/or the quantity of times that the second terminal device transmits the data; and the processing unit 1102 is specifically configured to: skip using the second resource, if the first resource and the second resource overlap, and the transmission data of the terminal device 110 is retransmission data; or skip using the second resource, if the first resource and the second resource overlap, and the transmission data of the second terminal device is initial transmission data; or skip using the second resource, if the first resource and the second resource overlap, the transmission data of the terminal device 110 is retransmission data, and the transmission data of the second terminal device is initial transmission data; or reselect a resource if the first resource and the second resource overlap, and the transmission data of the terminal device 110 is initial transmission data; or reselect a resource if the first resource and the second resource overlap, and the transmission data of the second terminal device is initial transmission data; or reselect a resource if the first resource and the second resource overlap, the transmission data of the terminal device 110 is initial transmission data, and the transmission data of the second terminal device is initial transmission data.

Optionally, the preset condition includes the quantity of second resources; and the processing unit 1102 is specifically configured to: skip using the second resource, if the first resource and the second resource overlap, and the quantity of second resources is less than or equal to a seventh threshold; or skip using the second resource, if the first resource and the second resource overlap, and a quantity of subframes in which the second resource is located is less than or equal to an eighth threshold; or reselect a resource if the first resource and the second resource overlap, and the quantity of second resources is greater than a ninth threshold; or reselect a resource if the first resource and the second resource overlap, and a quantity of subframes in which the second resource is located is greater than a tenth threshold.

Optionally, the determining unit 1101 is further configured to determine that a resource allocation mode of the second terminal device is any one of the following modes: a mode in which a base station schedules a resource; a mode of selecting a resource based on partial sensing; a mode of selecting a resource based on sensing; and a mode of selecting a resource based on random selection.

Optionally, a resource allocation mode of the terminal device 110 is any one of the following modes: a mode of autonomously selecting a resource;

a mode of selecting a resource based on non-partial sensing; and a mode of selecting or reselecting a resource based on sensing.

The terminal device shown in this embodiment of this application may perform the technical solution of the resource selection method in the foregoing embodiment. An implementation principle and a beneficial effect of the terminal device are similar to those of the resource selection method. Details are not described herein again.

Figure 13:
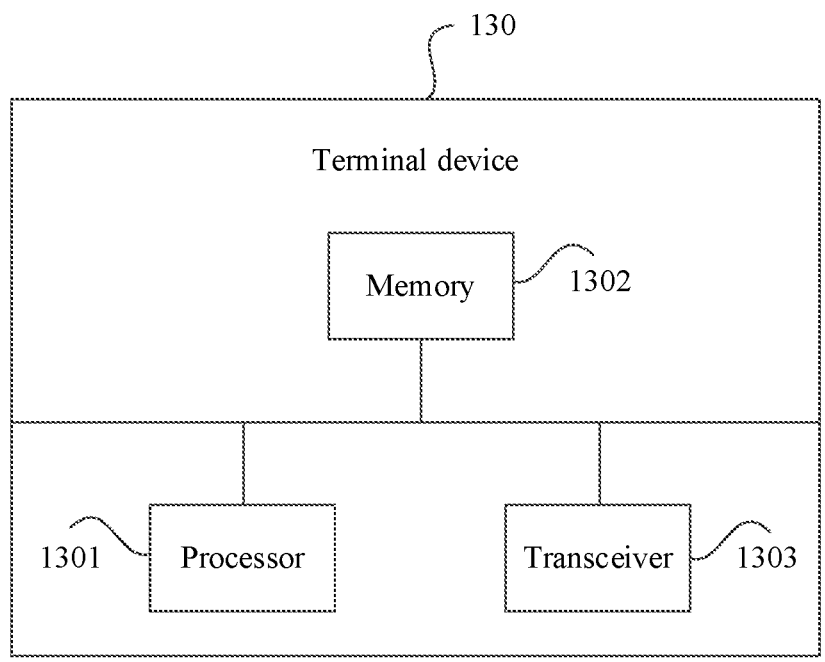
FIG. 13 is a schematic structural diagram of a terminal device according to an embodiment of this application.

FIG. 13 is a schematic structural diagram of a terminal device 130 according to an embodiment of this application. Referring to FIG. 13, the terminal device 130 may include a processor 1301 and a memory 1302. The processor 1301 and the memory 1302 are connected through a communications bus.

The memory 1302 is configured to store a program instruction.

The processor 1301 is configured to invoke and execute the program instruction stored in the memory 1302, to perform the following operations:

determining a first resource, where the first resource includes one or more of a resource used by a second terminal device to transmit data, a resource reserved by the second terminal device to transmit data, a resource determined based on the resource used by the second terminal device to transmit data, and a resource determined based on the resource reserved by the second terminal device to transmit data; and skipping using a second resource, or reselecting a resource, if the first resource and the second resource overlap, where the second resource includes one or more of a resource selected by the terminal device 130 to transmit data, a candidate resource to be used by the terminal device 130 to transmit data, a resource determined based on the resource selected by the terminal device 130 to transmit data, and a resource determined based on the candidate resource to be used by the terminal device 130 to transmit data.

Optionally, the terminal device 130 may further include a transceiver 1303.

The transceiver 1303 is configured to receive first information sent by the second terminal device. The first information is used to indicate the resource used by the second terminal device to transmit data.

In the operation of determining a first resource, the processor 1301 is specifically configured to invoke and execute the program instruction stored in the memory 1302, to determine the first resource based on the resource used by the second terminal device to transmit data.

Optionally, in the operation of determining a first resource, the processor 1301 is specifically configured to invoke and execute the program instruction stored in the memory 1302, to determine the first resource based on second information and the resource used by the second terminal device to transmit data; and the second information is used to indicate a reservation interval; or the second information is used to indicate a set of resource reservation periods that are available to the terminal device 130 or the second terminal device; or the second information is used to indicate a value range of a first parameter, where the first parameter is used to indicate a set of resource reservation periods that are available to the terminal device 130 or the second terminal device.

Optionally, in the operation of skipping using a second resource, or reselecting a resource, if the first resource and the second resource overlap, the processor 1301 is specifically configured to invoke and execute the program instruction stored in the memory 1302, to skip using the second resource, or reselect a resource, if the first resource and the second resource overlap, and a preset condition is met, where the preset condition includes one or more of the following:

a receive power at which the terminal device 130 receives a signal sent by the second terminal device, a priority of transmission data of the terminal device 130 and/or a priority of transmission data of the second terminal device, a type of transmission data of the terminal device 130 and/or a type of transmission data of the second terminal device, a quantity of times that the terminal device 130 transmits data and/or a quantity of times that the second terminal device transmits data, and a quantity of second resources.

Optionally, the preset condition includes the receive power at which the terminal device 130 receives the signal sent by the second terminal device; and in the operation of skipping using a second resource, or reselecting a resource, if the first resource and the second resource overlap, the processor 1301 is specifically configured to invoke and execute the program instruction stored in the memory 1302, to skip using the second resource, or reselect a resource, if the first resource and the second resource overlap, and the receive power at which the terminal device 130 receives the signal sent by the second terminal device is greater than a first threshold.

Optionally, the preset condition includes the priority of the transmission data of the terminal device 130 and/or the priority of the transmission data of the second terminal device; and in the operation of skipping using a second resource, or reselecting a resource, if the first resource and the second resource overlap, the processor 1301 is specifically configured to invoke and execute the program instruction stored in the memory 1302, to perform the following operations:

skipping using the second resource, if the first resource and the second resource overlap, and the priority of the transmission data of the terminal device 130 is less than or equal to a second threshold; or skipping using the second resource, if the first resource and the second resource overlap, and the priority of the transmission data of the second terminal device is greater than or equal to a third threshold; or skipping using the second resource, if the first resource and the second resource overlap, the priority of the transmission data of the terminal device 130 is less than or equal to a second threshold, and the priority of the transmission data of the second terminal device is greater than or equal to a third threshold; or reselecting a resource if the first resource and the second resource overlap, and the priority of the transmission data of the terminal device 130 is greater than a fourth threshold; or reselecting a resource if the first resource and the second resource overlap, and the priority of the transmission data of the second terminal device is greater than or equal to a fifth threshold; or reselecting a resource if the first resource and the second resource overlap, the priority of the transmission data of the terminal device 130 is greater than a fourth threshold, and the priority of the transmission data of the second terminal device is greater than or equal to a fifth threshold.

Optionally, the preset condition includes the priority of the transmission data of the terminal device 130 and the priority of the transmission data of the second terminal device; and in the operation of skipping using a second resource, or reselecting a resource, if the first resource and the second resource overlap, the processor 1301 is specifically configured to invoke and execute the program instruction stored in the memory 1302, to skip using the second resource, or reselect a resource, if the first resource and the second resource overlap, and a difference between the priority of the transmission data of the terminal device 130 and the priority of the transmission data of the second terminal device is less than or equal to a sixth threshold.

Optionally, the preset condition includes the type of the transmission data of the terminal device 130 and/or the type of the transmission data of the second terminal device; and in the operation of skipping using a second resource, or reselecting a resource, if the first resource and the second resource overlap, the processor 1301 is specifically configured to invoke and execute the program instruction stored in the memory 1302, to perform the following operations:

skipping using the second resource, if the first resource and the second resource overlap, and the transmission data of the terminal device 130 is non-security-related data; or skipping using the second resource, if the first resource and the second resource overlap, and the transmission data of the second terminal device is security-related data; or skipping using the second resource, if the first resource and the second resource overlap, the transmission data of the terminal device 130 is non-security-related data, and the transmission data of the second terminal device is security-related data; or reselecting a resource if the first resource and the second resource overlap, and the transmission data of the terminal device 130 is security-related data; or reselecting a resource if the first resource and the second resource overlap, and the transmission data of the second terminal device is security-related data; or reselecting a resource if the first resource and the second resource overlap, the transmission data of the terminal device 130 is security-related data, and the transmission data of the second terminal device is security-related data.

Optionally, the preset condition includes the quantity of times that the terminal device 130 transmits the data and/or the quantity of times that the second terminal device transmits the data; and in the operation of skipping using a second resource, or reselecting a resource, if the first resource and the second resource overlap, the processor 1301 is specifically configured to invoke and execute the program instruction stored in the memory 1302, to perform the following operations:

skipping using the second resource, if the first resource and the second resource overlap, and the transmission data of the terminal device 130 is retransmission data; or skipping using the second resource, if the first resource and the second resource overlap, and the transmission data of the second terminal device is initial transmission data; or skipping using the second resource, if the first resource and the second resource overlap, the transmission data of the terminal device 130 is retransmission data, and the transmission data of the second terminal device is initial transmission data; or reselecting a resource if the first resource and the second resource overlap, and the transmission data of the terminal device 130 is initial transmission data; or reselecting a resource if the first resource and the second resource overlap, and the transmission data of the second terminal device is initial transmission data; or reselecting a resource if the first resource and the second resource overlap, the transmission data of the terminal device 130 is initial transmission data, and the transmission data of the second terminal device is initial transmission data.

Optionally, the preset condition includes the quantity of second resources; and in the operation of skipping using a second resource, or reselecting a resource, if the first resource and the second resource overlap, the processor 1301 is specifically configured to invoke and execute the program instruction stored in the memory 1302, to perform the following operations:

skipping using the second resource, if the first resource and the second resource overlap, and the quantity of second resources is less than or equal to a seventh threshold; or skipping using the second resource, if the first resource and the second resource overlap, and a quantity of subframes in which the second resource is located is less than or equal to an eighth threshold; or reselecting a resource if the first resource and the second resource overlap, and the quantity of second resources is greater than a ninth threshold; or reselecting a resource if the first resource and the second resource overlap, and a quantity of subframes in which the second resource is located is greater than a tenth threshold.

Optionally, the processor 1301 is configured to invoke and execute the program instruction stored in the memory 1302, to determine that a resource allocation mode of the second terminal device is any one of the following modes: a mode in which a base station schedules a resource; a mode of selecting a resource based on partial sensing; a mode of selecting a resource based on sensing; and a mode of selecting a resource based on random selection.

Optionally, a resource allocation mode of the terminal device 130 is any one of the following modes: a mode of autonomously selecting a resource; a mode of selecting a resource based on non-partial sensing; and a mode of selecting or reselecting a resource based on sensing.

The terminal device 130 shown in this embodiment of this application may perform the technical solution of the resource selection method in the foregoing embodiment. An implementation principle and a beneficial effect of the terminal device 130 are similar to those of the resource selection method. Details are not described herein again.

Figure 14:
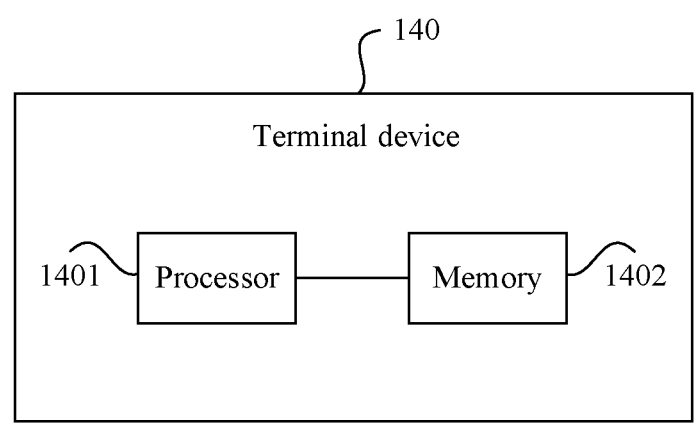
FIG. 14 is a schematic structural diagram of another terminal device according to an embodiment of this application.

FIG. 14 is a schematic structural diagram of a terminal device 140 according to an embodiment of this application. Referring to FIG. 14, the terminal device 140 may include a processor 1401 and a memory 1402. The processor 1401 and the memory 1402 are connected through a communications bus.

The memory 1402 is configured to store a program instruction.

The processor 1401 is configured to invoke and execute the program instruction stored in the memory 1402, to perform the resource selection method in any one of the foregoing embodiments.

The terminal device 140 shown in this embodiment of this application may perform the technical solution of the resource selection method in the foregoing embodiment. An implementation principle and a beneficial effect of the terminal device 140 are similar to those of the resource selection method. Details are not described herein again.

It should be understood that the processors shown in FIG. 13 and FIG. 14 may be a central processing unit (CPU), or may be another general purpose processor, a digital signal processor (DSP), an application-specific integrated circuit (ASIC), or the like. The general purpose processor may be a microprocessor, or the processor may be any conventional processor, or the like. Operations of the methods disclosed with reference to this application may be directly performed and accomplished by using a hardware processor, or may be performed and accomplished by using a combination of hardware and software modules in the processor.

All or some of the operations of the method embodiment may be implemented by a program instructing related hardware. The foregoing program may be stored in a readable memory. When the program is executed, the operations of the foregoing method embodiment are performed. The foregoing memory (storage medium) includes a read-only memory (ROM), a RAM, a flash memory, a hard disk, a solid state disk, a magnetic tape, a floppy disk, a compact disc, and any combination thereof.

An embodiment of this application further provides a computer readable storage medium. The computer readable storage medium stores a computer program, and when the computer program is executed by a processor, the resource selection method in any one of the foregoing embodiments is performed.

The computer readable storage medium shown in this embodiment of this application may perform the technical solution of the resource selection method in the foregoing embodiment. An implementation principle and a beneficial effect of the computer readable storage medium are similar to those of the resource selection method. Details are not described herein again.

An embodiment of this application further provides a chip. The chip stores a computer program, and when the computer program is executed by a processor, the resource selection method in any one of the foregoing embodiments is performed.

The chip shown in this embodiment of this application may perform the technical solution of the resource selection method in the foregoing embodiment. An implementation principle and a beneficial effect of the chip are similar to those of the resource selection method. Details are not described herein again.

An embodiment of this application further provides a computer program product including an instruction. When the computer program product is run on a terminal device, the terminal device is enabled to perform the resource selection method in any one of the foregoing embodiments.

The computer program product including the instruction shown in this embodiment of this application may perform the technical solution of the resource selection method in the foregoing embodiment. An implementation principle and a beneficial effect of the computer program product are similar to those of the resource selection method. Details are not described herein again.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general purpose computer, a dedicated computer, a computer network, or other programmable apparatuses. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person skilled in the art should be aware that in the foregoing one or more examples, functions described in the embodiments of this application may be implemented by hardware, software, firmware, or any combination thereof. When this application is implemented by software, the foregoing functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a general purpose or dedicated computer.

What is claimed is:

1. A resource selection method, comprising:
determining, by a first terminal device, a first resource, wherein the first resource comprises one or more of a resource used by a second terminal device to transmit data, a resource reserved by the second terminal device to transmit data, a resource determined based on the resource used by the second terminal device to transmit data, or a resource determined based on the resource reserved by the second terminal device to transmit data; and
skipping, by the first terminal device, using a second resource, or reselecting, by the first terminal device, a third resource, when the first resource and the second resource overlap and a preset condition is met, wherein the preset condition comprises that a priority of transmission data of the first terminal device is greater than a priority of transmission data of the second terminal device, and that the priority of transmission data of the second terminal device is lower than or equal to a predetermined threshold, wherein the predetermined threshold is different from the priority of transmission data of the first terminal device, wherein the second resource comprises one or more of a resource selected by the first terminal device to transmit data, a candidate resource to be used by the first terminal device to transmit data, a resource determined based on the resource selected by the first terminal device to transmit data, or a resource determined based on the candidate resource to be used by the first terminal device to transmit data.

2. The resource selection method according to claim 1, wherein the determining, by the first terminal device, the first resource comprises:
receiving, by the first terminal device, first information sent by the second terminal device, wherein the first information indicates the resource used by the second terminal device to transmit data; and determining, by the first terminal device, the first resource based on the resource used by the second terminal device to transmit data.

3. The resource selection method according to claim 2, wherein the first information is sidelink control information (SCI).

4. The resource selection method according to claim 1, wherein the determining, by the first terminal device, the first resource comprises:
determining, by the first terminal device, the first resource based on second information and the resource used by the second terminal device to transmit data, wherein the second information indicates one of a reservation interval, a set of resource reservation periods that are available to the first terminal device or the second terminal device, or a value range of a first parameter, wherein the first parameter indicates a set of resource reservation periods that are available to the first terminal device or the second terminal device.

5. The method according to claim 1,
wherein the preset condition is further determined according to one or more of the following:
a receive power at which the first terminal device receives a signal sent by the second terminal device, a type of transmission data of the first terminal device and/or a type of transmission data of the second terminal device, a quantity of times that the first terminal device transmits data and/or a quantity of times that the second terminal device transmits data, and a quantity of second resources.

6. The method according to claim 5, wherein the preset condition further comprises that the receive power at which the first terminal device receives the signal sent by the second terminal device is greater than a first threshold.

7. The resource selection method according to claim 5, wherein the preset condition further comprises
that the difference between the priority of the transmission data of the first terminal device and the priority of the transmission data of the second terminal device is greater than or equal to a sixth threshold.

8. The resource selection method according to claim 5, wherein the skipping of using the second resource, or the reselecting the third resource comprises:
skipping, by the first terminal device, using the second resource, when the first resource and the second resource overlap, and at least one of the transmission data of the first terminal device or the transmission data of the second terminal device is retransmission data; or
reselecting, by the first terminal device, the third resource when the first resource and the second resource overlap, and at least one of the transmission data of the first terminal device or the transmission data of the second terminal device is initial transmission data.

9. The method according to claim 5, wherein the skipping of using the second resource, or the reselecting of the third resource comprises:
skipping, by the first terminal device, using the second resource, when the first resource and the second resource overlap, and the quantity of second resources is less than or equal to a seventh threshold; or
skipping, by the first terminal device, using the second resource, when the first resource and the second resource overlap, and a quantity of subframes in which the second resource is located is less than or equal to an eighth threshold; or reselecting, by the first terminal device, the third resource when the first resource and the second resource overlap, and the quantity of second resources is greater than a ninth threshold; or
reselecting, by the first terminal device, the third resource when the first resource and the second resource overlap, and a quantity of subframes in which the second resource is located is greater than a tenth threshold.

10. The resource selection method according to claim 5, wherein the signal sent by the second terminal device is a reference signal.

11. The resource selection method according to claim 10, wherein the reference signal sent by the second terminal device is a reference signal on a channel for transmitting data.

12. The method according to claim 1, wherein the skipping, by the first terminal device, using the second resource, or the reselecting, by the first terminal device, of the third resource, further comprises:
skipping, by the first terminal device, using the second resource, when the first resource and the second resource overlap, and the priority of the transmission data of the first terminal device is greater than or equal to a second threshold; or
reselecting, by the first terminal device, the third resource when the first resource and the second resource overlap, and the priority of the transmission data of the first terminal device is less than a fourth threshold.

13. The resource selection method according to claim 1, wherein a resource allocation mode of the second terminal device is any one of the following modes:
a mode in which a base station schedules a resource;
a mode of selecting a resource based on partial sensing;
a mode of selecting a resource based on sensing; and
a mode of selecting a resource based on random selection.

14. The resource selection method according to claim 1, wherein
a resource allocation mode of the first terminal device is any one of the following modes:
a mode of autonomously selecting a resource;
a mode of selecting a resource based on non-partial sensing; and
a mode of selecting or reselecting a resource based on sensing.

15. The resource selection method according to claim 1, wherein data having a higher priority is transmitted preferentially.

16. The resource selection method according to claim 1, wherein the resource determined based on the resource selected by the first terminal device to transmit data comprises resources that are in a group of periodic subframes and that are the same in frequency domain.

17. The resource selection method according to claim 1, wherein the resource determined based on the resource selected by the first terminal device to transmit data is determined based on the resource selected by the first terminal device to transmit data and a resource reservation interval of the first terminal device.

18. The resource selection method according to claim 17, wherein a time domain interval between the resource represented by a resource 2 determined based on the resource selected by the first terminal device to transmit data and the resource represented by a resource 1 selected by the first terminal device to transmit data is M'×j, wherein j=1, 2, 3, . . . , C, C is a quantity of resources reserved by the first terminal device, and M' is the resource reservation interval of the first terminal device.

19. A first terminal device, comprising:
a processor; and
a memory connected to the processor through a communications bus, and configured to store program instructions, which, when executed by the processor, cause the first terminal device to perform operations comprising:
determining a first resource, wherein the first resource comprises one or more of a resource used by a second terminal device to transmit data, a resource reserved by the second terminal device to transmit data, a resource determined based on the resource used by the second terminal device to transmit data, or a resource determined based on the resource reserved by the second terminal device to transmit data; and
skipping using a second resource, or reselecting a third resource, when the first resource and the second resource overlap and a preset condition is met, wherein the preset condition comprises that a priority of transmission data of the first terminal device is greater than a priority of transmission data of the second terminal device, and that the priority of transmission data of the second terminal device is lower than or equal to a predetermined threshold, wherein the predetermined threshold is different from the priority of transmission data of the first terminal device, wherein the second resource comprises one or more of a resource selected by the first terminal device to transmit data, a candidate resource to be used by the first terminal device to transmit data, a resource determined based on the resource selected by the first terminal device to transmit data, or a resource determined based on the candidate resource to be used by the first terminal device to transmit data.

20. A non-transitory computer readable storage medium storing program instructions, which, when executed by a processor of a first terminal device, cause the first terminal device to perform operations comprising:
determining a first resource, wherein the first resource comprises one or more of a resource used by a second terminal device to transmit data, a resource reserved by the second terminal device to transmit data, a resource determined based on the resource used by the second terminal device to transmit data, or a resource determined based on the resource reserved by the second terminal device to transmit data; and
skipping using a second resource, or reselecting a resource, when the first resource and the second resource overlap and a preset condition is met, wherein the preset condition comprises that a priority of transmission data of the first terminal device is greater than a priority of transmission data of the second terminal device, and that the priority of transmission data of the second terminal device is lower than or equal to a predetermined threshold, wherein the predetermined threshold is different from the priority of transmission data of the first terminal device, wherein the second resource comprises one or more of a resource selected by the first terminal device to transmit data, a candidate resource to be used by the first terminal device to transmit data, a resource determined based on the resource selected by the first terminal device to transmit data, or a resource determined based on the candidate resource to be used by the first terminal device to transmit data.

* * * * *